United States Patent [19]

Naito et al.

[11] Patent Number: 5,292,799
[45] Date of Patent: Mar. 8, 1994

[54] SOLVENT-FREE, COLD-SETTING ORGANOSILOXANE COMPOSITION AND ITS USE

[75] Inventors: Hiroyuki Naito; Tomio Suzuki, both of Tokyo; Kimie Watanabe, Funabashi, all of Japan

[73] Assignee: Suzuki Sangyo Co., Ltd., Tokyo, Japan

[21] Appl. No.: 928,478

[22] Filed: Aug. 12, 1992

[30] Foreign Application Priority Data

Aug. 5, 1992 [JP] Japan ................................ 3-205311

[51] Int. Cl.$^5$ ................................................ C08K 3/10
[52] U.S. Cl. ................................ 524/783; 524/779; 524/786; 524/789; 528/16; 528/17; 528/18; 528/25; 528/29; 528/901
[58] Field of Search ................ 528/901, 18, 16, 17, 528/25, 29; 524/789, 786, 779, 783

[56] References Cited

U.S. PATENT DOCUMENTS

| | | | |
|---|---|---|---|
| 3,294,739 | 12/1966 | Weyenberg | 528/901 |
| 3,647,917 | 3/1972 | Schulz et al. | 528/901 |
| 4,517,352 | 5/1985 | White et al. | 528/901 |

FOREIGN PATENT DOCUMENTS

| | | |
|---|---|---|
| 57-94057 | 6/1982 | Japan . |
| 60-51756 | 3/1985 | Japan . |
| 3-68676 | 3/1991 | Japan . |

OTHER PUBLICATIONS

The American Heritage Dictionary, p. 1052, Second College Edition (1982) Houghton Mifflin Co. Boston, Mass.

*Primary Examiner*—Melvyn I. Marquis
*Attorney, Agent, or Firm*—Armstrong, Westerman, Hattori, McLeland & Naughton

[57] ABSTRACT

A solvent-free, cold-setting ternary organosiloxane composition is disclosed, which contains (A) liquid organopolysiloxane, (B) a cross-linking agent, and (C) a curing catalyst, said organopolysiloxane (A) being constituted by organosilicon group of X—Si (wherein X represents a hydrogen atom or a monovalent hydrocarbyl group) and functional side chain of OR (wherein R represents a hydrogen atom, a $C_1$–$C_5$ alkyl group or an acyl group), said cross-linking agent (B) being one or more organometallic compounds selected from the group consisting of an organoaluminum compound, an organoboron compound, an organosilicon compound, an organotitanium compound and an organozirconium compound having at least one functional group selected from among an alkoxy group, an acyloxy group and an oxime group, and said curing catalyst (C) being a metal-containing organic compound, with the total contents of the metal elements of the ternary composition being 40% by weight or more in terms of $MO_{y/2}$ (wherein M represents aluminum, boron, silicon, titanium or zirconium, and y represents a valency of the metal element). A transparent film, a coating material, a binder and a structure formed by using same are also disclosed.

21 Claims, No Drawings

SOLVENT-FREE, COLD-SETTING ORGANOSILOXANE COMPOSITION AND ITS USE

BACKGROUND OF THE INVENTION

This invention relates to a solvent-free, cold-setting organosiloxane composition containing liquid organopolysiloxane as a major component, and uses thereof. More particularly, it relates to a solvent-free, cold-setting organosiloxane composition of one-pack type which can form, when in contact with moisture, a polymer having polysiloxane bonds as a main chain and having a good flexibility, incombustible or fire-retardant properties, heat-resistant properties, alkali-resistant properties and water-impermeable properties, and which can be used for forming a transparent film, a coating material, a binder, a structure, etc. and uses of the composition.

Solvents have so far been important for preparing coating compositions, generally accounting for 45 to 50% of such paint compositions. More than 50 kinds of solvents are illustrated as major solvents. In particular, organic solvents are important and indispensable for dissolving or dispersing film-forming materials to impart a proper fluidity, coating properties and film-forming properties. Thus, organic solvents have so far been inevitable for producing coating compositions.

However, organic solvents can be described as dangerous objects due to their high combustibility and capability to induce various troubles (e.g., anesthesia, troubles of the central nervous system and the autonomic nervous system, troubles of liver and kidney, and inflammation of skin or eye), thus requiring control and caution in handling.

The environment of the earth cannot afford the use of such combustible, dangerous organic solvents which induce human troubles in daily commodities. Thus it has been eagerly desired to develop solvent-free coating compositions. Although aqueous emulsion coating compositions and powder coating compositions have been developed as solvent-free coating compositions. These coating compositions have failed to have sufficient properties.

Organosiloxanes to be used as the major component of the compositions of the present invention are known as typical compounds of organo-silicon compounds and are represented by the structural formula of $R_3SiO(R_2SiO)_nSiR_3$, $(R_2SiO)_n$, etc. As is shown by the structural formulae, organosiloxanes have a chemical structure wherein inorganic siloxane bonds of Si—O and organic groups (e.g., alkyl groups, phenyl groups, aryl groups, alkoxy groups, acyloxy groups, etc.) are bound to each other. Thus, organosiloxanes have both inorganic features of silanol bonds (Si—OH) and organic features of C—C bonds or C—O bonds.

On the other hand, atomic bond energy of a C—C bond is 84.9 kcal/mol and that of a C—O bond is 80.9 kcal/mol, whereas that of a Si—O bond is as large as 106 kcal/mol (about 25% larger than that of the organic bonds). Therefore, it can be seen that the siloxane bonds are more stable than the organic bonds against physical energy such as heat or light and chemical energy such as oxidation.

Further, organic resins are liable to undergo radical decomposition when irradiated with light rays of the ultraviolet ray region since they are sensitive to light rays of 300 to 350 nm in wave-length. On the other hand, methyl type silicone resins are known to absorb almost no light rays in the ultraviolet ray region, thus being suggestively inert against ultraviolet rays and strongly weatherable.

About 50% of the siloxane bonds are believed to be ionic bonds, and bond rotation is easier due to their longer atomic bond distance and lower electron density, and thus the bond angle can be changed by a comparatively small amount of energy. Accordingly, chains of siloxane bonds are more flexible than chains of C—C bonds, and are more resistant against heat or physical energy impact, thereby providing materials with a high flexibility.

As is described above, organosiloxanes having Si—O bonds are different in many points from organic compounds constituted by C—C bonds or C—O bonds. In particular, the organosiloxanes can be clearly differentiated from those organic compounds which are susceptible to oxidation or combustion.

Polymer siloxane compounds wherein organosiloxane units are cross-linked and polymerized to form a main chain composed of Si—O bonds are called silicones or silicone resins and are popularly used. Of these silicones, organopolysiloxanes having two different functional groups per molecule are generally called by the name of silane coupling agents and have been widely investigated and used as modifying agents for inorganic or organic materials and additives. In addition, the silicone resins are being widely used as electronic and electric products and daily commodities.

The reaction mechanism of polymerization of organosiloxane to form a cured product is considered a condensation reaction or addition reaction of reactive siloxane in the presence of water. With the organosiloxane of the present invention, too, functional alkoxy groups react with water at ordinary temperature to cause a dealcoholation reaction and produce silanol groups (first step). Then, the silanol groups in turn react with the alkoxy groups of a cross-linking agent in the presence of a metal-containing catalyst to undergo a condensation reaction (e.g., dealcoholation, deoximation, removal of acetic acid, etc.), resulting in polymerization and formation of a polymeric cured product having a three dimensional network structure (second step).

In general, varnishes, coating compositions, adhesives, and the like are mainly based on organic resins. Recent living environmental regulations have required incombustible or fire retardant, pollution-free materials in many fields. Under such situations the use of organic solvents which are dangerous and can cause environmental pollution has been brought into question. Hence, pollution free materials involving no such problems have eagerly been desired.

In film forming coating compositions or coating materials, materials requiring a heating step to cure are limited as to scope of their application. Therefore, materials which can form a film at ordinary temperature are preferable from the standpoint of general-purpose properties. Conventional techniques of a film forming at ordinary temperature have employed the evaporation solvent or the addition a curing catalyst. In the case of adding a curing catalyst, it must be added immediately before application in view of shelf life of the material and, therefore, the material must be of two-pack type. The two-pack type materials have the defects that the two packs must be mixed immediately before application, and that their storage, work control and application procedures must be complicated.

One-pack type coating compositions utilizing curing with moisture are retained in a container capable of excluding the contents from contact with moisture, such as a tube or a cartridge for ensuring enough shelf life and, upon use, the contents of the container are exposed to the air. Thus, there have been required, coating compositions or like materials having sufficient shelf life which are of one-pack type and permit application at ordinary temperature.

In order to meet the requirement, siloxane compounds which have Si—O bonds resistant against heat or light and which have good weatherability, high heat resistance and good flexibility as has been described hereinabove have widely been investigated, part of the investigation results having been put into practice. Typical examples of the results and remaining problems are described hereinafter mainly referring to coating compositions and coating materials.

As a popular example of applying organsiloxanes to coating compositions, there are illustrated zinc-rich coating compositions developed in World War II. These coating composition comprise a hydrolyzed product of tetraethoxysilane diluted with about the same amount of isopropyl alcohol and about two-fold amount of zinc powder. This type of compositions is being widely used as anti-corrosive paints capable of forming a coating film at ordinary temperature.

There have been developed coating compositions prepared by diluting, with an organic solvent, polymers of organosiloxane or modified organosiloxane or copolymers thereof with various organic compounds, together with or without other organic resins. Most of the conventionally developed techniques are based on the above-described compositions. For example, a technique of preparing a modified tetraalkoxysilane as a filming agent in the presence of the same or more amount of a solvent, and applying the composition to an object, followed by air-drying or hot-air drying to form a heat-resistnt, anti-corrosive coat is disclosed in, for example, Japanese Examined Patent Publication No. S-63-28942.

There have been many examples of merely combining organic compounds (organic resins) and organosiloxanes to prepare coating materials or the like. Most of them require heating upon film formation. Typical example thereof is described in Japanese Examined Patent Publication No.S-55-41274, etc. wherein tetraethoxysilane and methyltriethoxysilane are mixed with polyvinyl butyral butylated methylolmelamine, and an object coated by the mixture is heated to 130° C. to form a coating.

Many studies have been made on utilization of organosiloxane as a filming agent for a heat-resistant coating. Japanese Examined Patent Publication No.S-63-35183 discloses one typical example thereof wherein a coating composition prepared by adding a slight amount of an aluminum chelate compound to 50–80% by weight of a heat-resistant inorganic material (e.g., aluminum phosphate, zinc molybdate, calcium carbonate, zinc silicate powder, etc.), and adding thereto 20 to 50% by weight of a modified silicone resin is applied to an object, followed by baking at 180° C. to form a heat-resistant coating.

In addition, many techniques of preparing a coating composition using an organosiloxane in an organic solvent and filming the composition at ordinary temperature or elevated temperature have been disclosed, one example being disclosed in Japanese Examined Patent Publication No.H-63-58191.

As an example of utilizing a pure organosiloxane, there is illustrated a technique of preparing a durable, stainproof transparent film composed of organosiloxane, an organotin compound and a volatile dimethylpolysiloxane (Japanese Unexamined Patent Publication No.H-3-68676).

A technique of using a keto-enol tautomer compound for stabilizing a curing catalyst of a metal-containing organic compound in the polymer-forming organosiloxane has also been disclosed. For example, Japanese Examined Patent Application No. S-48-17859 discloses this technique with respect to a mixed system of a linear copolymer having carboxyl groups within the molecule, an aluminum alcoholate complex compound, and a solvent. As a similar technique, Japanese Unexamined Patent Application No. H-1-129066 discloses to use a keto-enol tautomer compound together with a curing agent of chelate compound in a mixed system of a resin having isocyanato groups, hydroxyl groups, epoxy groups, carboxyl groups and/or amino groups partly reacted with alkoxysilane group or hydroxysilane group, an epoxy resin and an organic solvent.

On the other hand, alkali silicates having silanol groups such as water glass are known as inorganic compounds having Si—O siloxane bonds. Many investigations have been made on water glass since it is inexpensive and can form a polymer having siloxane bonds when applied at ordinary temperature. Many application studies have also been made to produce acid- and heat-resistant coating materials and solidified products from the inorganic silanol compounds including water glass.

However, polymers having siloxane bonds formed by curing the alkali silicate involve many problems due to copresence of an alkali component in the polymer. Further, inorganic polymers are generally hard and nonflexible, and it is essentially impossible to expect flexibility of a cured product formed of the inorganic polymer.

Water glass contains water, and hence it is of a so-called hydraulic type. Therefore, cured products of water glass from which water has been removed contain many pores. The pores inevitably impart susceptibility to water and water permeability to the cured products. Therefore, it is impossible to protect iron- or concrete-made substrates from corrosion by forming a protective coating of the hydraulic inorganic polymer. No materials of this type have attained the protecting ability.

Further, Si—O bonds are so reactive with alkali metal ions, regardless of whether the bonds are formed by an inorganic material or an organic material, that the bonds are easily cleaved, in the presence of an alkali metal ion such as sodium ion to form alkali silicate compounds. Therefore, compounds having Si—O bonds tend to have a poor alkali resistance even in a highly polymerized state, and application of such compounds having siloxane bonds to an alkaline material such as portland cement or concrete or to a situation which requires sea-water resistance or alkali resistance is quite limited.

In addition, the above-described inorganic coating materials or coating agents have a poor compatibility with organic materials and have generally no adhesion property to organic materials. Therefore, maintenance of objects having an organic coating using a general-purpose inorganic coating must be conducted after completely removing the existing organic coating. That is, it is impossible to apply the inorganic coating composition to an organic coating formed as a prime coat.

As has been seen with the above-described prior art, the application of the organopolysiloxane as a coating component has mostly begun with auxiliary addition to an organic compound-based coating composition containing an organic polymer or an organic resin having a main chain of C—C bonds and being excellent in filming properties, dilution properties with a solvent and drying properties after being coated for the purpose of improving the coating composition.

Hence, these conventional coating compositions inevitably contain the dangerous, trouble-causing organic solvents, and there have been seen no positive attempts to produce solvent-free coating compositions mainly using organosiloxane having incombustible or fire retardant Si—O bonds.

Namely, there have been completed no techniques of producing a coating composition in which the main chain is composed of only polysiloxane bond, [(≡Si—O—)$_n$], and the content of a silicon component is as high as 50% by weight or more in order to make the polymer incombustible or fire retardant (Condition 1), in which the metal components of silicon, titanium, zirconium, boron and aluminum are stably contained in a high concentration of 40% by weight or more in terms of $MO_{y/2}$ (condition 2), which can be provided as a one-pack composition (Condition 3), and which can be cured at ordinary temperature according to a moisture-curing method to form an effective coating (Condition 4).

In addition, there have been completed no techniques of producing a coating composition which provides a coating having a siloxane bond polymer formed in the absence of a solvent and yet having sufficient flexibility, heat resistance, alkali resistance and water impermeability.

There have been no attempts of developing an inorganic coating composition having high performance by combining an organopolysiloxane with a liquid organometallic compound, particularly liquid alkoxyborate.

Additionally, concentrations or contents of metal element components of aluminum, boron, silicon, titanium and zirconium are presented by % by weight in terms of oxides and are in some cases abbreviated as "$MO_{y/2}$ % by weight" in this specification.

In the above-described prior art, the existence of water or silanol groups in the solvent-free liquid organosiloxane composition allows curing reactions such as gelation and solidification to proceed during storage. There has not been disclosed a definite process of subjecting an organosiloxane-containing coating composition to a preliminary step of keeping the temperature at 100° C. or less for a predetermined period of time in the absence of water to previously remove water or silanol groups carried by the organosiloxane or fillers added to the composition for ensuring one-pack stability and enough shelf life of the composition.

Particularly, there have been disclosed no techniques of subjecting a colored coating composition containing a pigment, a colorant or like filler to a special preliminary step for previously removing water or the like carried by the fillers to thereby avoid the curing reaction caused by water in the course of production or storage of the composition.

The inventors have given attention to the following fundamental problems which conventional transparent films, coating compositions, coating materials, binders, structures, etc. utilizing the above-described prior art polymers.

1) In the case of using an organic compound having C—C bonds as the main chain:
   (a) use of an organic solvent which is dangerous and harmful is inevitable;
   (b) the composition is quite susceptible to oxidation by heat or fire;
   (c) a poisonous and harmful gas is produced upon combustion;
   (d) the composition provides quite poor weatherability.

2) In the case of using a silicon compound having incombustible Si—O bonds as the main chain:
   (a) the composition provides poor flexibility;
   (b) the composition provides poor alkali resistance due to its high reactivity with an alkali metal element;
   (c) cured products containing Si—O bonds formed due to hydraulic property contain many pores, thus the products lack water impermeability;
   (d) the composition cannot be applied to a material composed of inorganic Si—O bonds since organic materials have no adhesion property to the inorganic surface.

In addition to the above-described problems with the prior art, the inventors have given attention to the following facts. That is, in the conventional techniques of using siloxane bond-containing polymers, (1) energy- and labor-saving techniques enabling a one-pack form and application at ordinary temperature have not been completed, though the technique of applying a coating composition and heating it has been completed; (2) materials such as coating materials and coating compositions which permit in-situ application to form a coating with a incombustibility and fire retardance and with beautiful luster have not been widely used; (3) inorganic coating films which, when combusted, do not produce any poisonous and harmful gas have not been completed; and (4) a solvent-free, organosiloxane-containing coating composition has not been completed. With the above-described situation in mind, the inventors have acutely felt a deficiency of energy- and labor-saving techniques which, at the same time, can maintain the earth environment and have given attention thereto.

SUMMARY OF THE INVENTION

As a result of intensive investigations to utilize the advantageous features of siloxane bond (Si—O bond) that (a) it has a strong atomic bond energy and is therefore resistant against heat or light, (b) it absorbs less light rays of ultraviolet ray region and has therefore excellent weatherability and (c) it permits easy rotation of bond due to its long atomic bond distance and low electron density and therefore provides a high flexibility, the inventors have found that a liquid composition of a particular organosiloxane has the following characteristic features:

(1) A liquid composition constituted by a particular liquid organopolysiloxane and a cross-linking agent of organometallic compound can form a coating composition without any solvent;

(2) Preliminary treatment of removing water and silanol groups contained in the composition permits storage of the composition in the one-pack form even in the presence of a curing catalyst;

(3) When a metal-containing organic compound is allowed to be present in the particular organosiloxane liquid composition, it can form a cured polymer product when brought into contact with moisture in the atmosphere at ordinary temperature; and (4) The polymer having a main chain comprised of Si—O bonds including B—O bonds, Ti—O bonds, Zr—O bonds, etc. can exhibit highly functional polymer performance that cannot be obtained by the prior art.

It is an object of the present invention to provide a material which can find application to transparent films, coating materials, coating compositions, binders and structures and which can be produced from resource-saving substances that do not pollute the environment, or to provide a solvent-free, cold-setting organosiloxane composition in a one-pack form capable of being cured at ordinary temperature which permits formation of a polymer containing polysiloxane bond ($\equiv$Si—O—)$_n$ as a main chain and which can solve the above-described technical problems.

Other objects, features and advantages of the present invention will become apparent from the detailed description of the preferred embodiments of the invention to follow.

With the above-described objects in mind, the inventors have made intensive investigations and have completed the present invention.

According to the present invention, there is provided a solvent-free, cold-setting organosiloxane composition, which contains (A) liquid organopolysiloxane, (B) a cross-linking agent, and (C) a curing catalyst, said, organopolysiloxane (A) being constituted by organosilicon group of X—Si (wherein X represents a hydrogen atom or a monovalent hydrocarbyl group) and functional side chain of OR (wherein R represents a hydrogen atom, a $C_1$-$C_5$ alkyl group or an acyl group), said cross-linking agent (B) being one or more organometallic compounds selected from the group consisting of an organoaluminum compound, an organoboron compound, an organosilicon compound, an organotitanium compound and an organozirconium compound having at least one functional group selected from among an alkoxy group, an acyloxy group and an oxime group, and said curing catalyst (C) being a metal-containing organic compound, with the total content of the metal elements of the ternary composition being 40% by weight or more in terms of $MO_{y/2}$ (wherein M represents aluminum, boron, silicon, titanium or zirconium, and y represents a valency of the metal element).

The present invention provides the solvent-free, cold-setting organosiloxane composition as described above,, wherein said liquid organopolysiloxane (A) is a low molecular weight polysiloxane comprising one or more of the compounds represented by the following general formula (1):

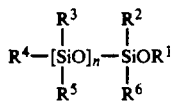
(1)

wherein $R^1$ represents a hydrogen atom or a $C_1$ to $C_5$ alkyl or acyl group, $R^2$ to $R^6$, which may be the same or different, each represents a hydrogen atom, $OR^1$ or a monovalent hydrocarbyl group, and n represents a number smaller than 15, and having a silicon content of 50% by weight or more on the basis of $SiO_2$.

The present invention further provides the solvent-free, cold-setting organosiloxane composition as described above, wherein said liquid organopolysiloxane (A) is compounded with a silicone resin having functional side chains of OR (wherein R represents a hydrogen atom or a $C_1$ to $C_5$ alkyl or acyl group).

The present invention further provides the solvent-free, cold-setting organosiloxane composition as described above, wherein said liquid organopolysiloxane (A) contains dissolved therein a thermoplastic resin of a linear carboxyl group-having organic high-molecular compound in an amount of not more than 30% by weight.

The present invention further provides the solvent-free, cold-setting organosiloxane composition as described above, wherein said cross-linking agent (B) is one or more organometallic compounds represented by the following general formula (2) or (3):

(2)

(3)

wherein N represents aluminum or boron, Q represents silicon, titanium or zirconium, $R^1$ represents a hydrogen atom, a $C^1$-$C^5$ alkyl or acyl group, or an oxime group, $R^7$ represents a hydrogen atom, $OR^1$ or a monovalent hydrocarbyl group, p represents an integer of 0, 1 or 2, and m represents an integer of 0, 1, 2 or 3.

The present invention further provides the solvent-free, cold-setting organosiloxane composition as described above, wherein said cross-linking agent (B) is mixed in an amount of 50% by weight or less based on said liquid organopolysiloxane (A).

The present invention further provides the solvent-free, cold-setting organosiloxane composition as described above, wherein said liquid organopolysiloxane (A) or a mixture of said liquid organopolysiloxane (A) and said cross-linking agent (B) is previously subjected to a preliminary step at a temperature not higher than 100° C. for not shorter than 10 minutes in the absence of water to thereby remove contained silanol groups, and then is compounded with said curing catalyst (C), and which can be stored in a one-pack form.

The present invention further provides the solvent-free, cold-setting organosiloxane composition as described above, wherein said curing catalyst (C) is one or more of metal-containing organic compounds, with the metal being zinc, cobalt, aluminum or tin.

The present invention further provides the solvent-free, cold-setting organosiloxane composition as described above, wherein said curing catalyst (C) is in a blocked form of being unable to catalyze the reaction, with the blocking being attained by compounding a keto-enol tautomer compound selected from the group consisting of alkyl group- or trifluoro group-containing β-keto-acids, β-diketone compounds and malonic esters or the mixture of two or more of them in an amount of 50% by weight or less than that.

The present invention further provides the solvent-free, cold-setting organosiloxane composition as described above, wherein said curing catalyst (C) is compounded with one or more alcohols selected from the group consisting of monohydric alcohols and polyhydric alcohols in an amount of 50% by weight or less than that to thereby retard the catalytic reaction.

The present invention further provides the solvent-free, cold-setting organosiloxane composition as described above, wherein said curing catalyst (C) of metal-containing organic compound or compounds compounded or not compounded with the keto-enol tautomer compound or the mixture thereof is contained in an amount of 10% by weight or less based on said liquid organo-polysiloxane (A).

The present invention further provides a transparent film, which comprises a cured polymer containing as main chain polysiloxane bonds formed by bringing the solvent free, cold-setting ternary organopolysiloxane described above into contact with moisture.

The present invention further provides a coating material, which comprises a cured composite formed by bringing into contact with moisture a paint like mixture of 100 parts by weight of the solvent-free, cold-setting ternary organopolysiloxane described above and 1 to 400 parts by weight of one or more of activating agents, fillers, pigments, and colorants, to thereby form main chain of polysiloxane bonds.

The present invention further provides a binder which comprises a cured composite formed by bringing into contact with moisture a fluid or plastic mixture of 100 parts by weight of the solvent-free, cold-setting ternary organopolysiloxane described and 1 to 500 parts by weight of one or more of activating agents, fillers, pigments, and colorants to thereby form main chain of polysiloxane bonds.

The present invention further provides the binder as described above, wherein said fillers are compounded with said liquid organopolysiloxane (A), said cross-linking agent (B) or a mixture thereof, then subjected to a preliminary step of heating to a temperature of 100° C. or less in the absence of water to thereby remove contained water or silanol groups, and then compounded with said curing catalyst (C).

The present invention further provides the binder as described above, wherein said activating agents to be previously compounded in said fluid or plastic mixture is a powder of one or more of boric acid-containing compounds, chromic acid-containing compounds and phosphoric acid-containing compounds.

The present invention further provides a structure which is formed by bringing into contact with moisture a mixture of 100 parts by weight of the paint-like mixture described above or the fluid or plastic mixture described above and 1 to 2,000 parts by weight of one or more of reinforcing materials, aggregates and moldings to thereby produce a composite polymer containing as main chain polysiloxane bonds.

Additionally, the terms of "transparent film", "coating material", "binder" and "structure" are defined as follows, and will be described in detail hereinafter.

Transparent film: Transparent film such as clear coating material and protective material;

Coating material: Paint, varnish, undercoating material and protective coating material having a certain thickness;

Binder: Adhesive, binder, sealer, fixing agent for various aggregates, cementing material and anchoring agent;

Structure: Building material, flooring and wall material, reinforcing material for a structural component, such as mass material, plate like material, network material, fibrous material and a fabric material, and structural shape formed by unifying aggregate or molding.

DETAILED DESCRIPTION OF THE PREFERRED EMBODIMENTS OF THE INVENTION

An important feature of the present invention is that the organopolysiloxane compound in a solvent-free state enables easy coating work and imparts desired properties to a resulting coating. The inventors have found that a solvent-free, paint-like liquid mixture composition having favorable properties can be obtained by using a particular organopolysiloxane having a specific range of polymerization degree, a specific cross-linking agent and a curing catalyst. It has also been found that the specific cross-linking agent functions not only as a cross-linking agent but as a agent for maintaining a liquid state suitable as a coating composition.

In developing an incombustible or fire retardant, heat-resistant product from organosiloxane wherein an organic group is bound to a Si—O bond utilizing the advantages of the Si—O bond, it is necessary to decrease the content of heat-susceptible organic component and increase the content of Si—O bond. For this purpose, the silicon content of the Si—O bond in the basic organopolysiloxane must be 50% by weight or more, preferably 53% by weight or more, on the basis of $SiO_2$ oxide.

Naturally, in the course of polymerization of the organopolysiloxane to form a polymeric cured product, a dealcoholation reaction takes place. As a result, part of the bound organic groups are eliminated, and the content of silicon component in the produced cured polymer product is higher than that of the starting material.

The specific mixed liquid composition of the present invention which comprises an organopolysiloxane (A), a cross-linking agent (B) and a curing catalyst (C), too, can provide an incombustible or fire retardant, heat-resistant product when the content of metallic element components (aluminum, boron, silicon, titanium and zirconium) presented in terms of $MO_{y/2}$ is adjusted to be at least 40% by weight, preferably 45% by weight or more. Needless to say, the metallic element content in the completed polymeric cured product is higher than the starting material as is the same with the above-described case.

The silicon content is calculated as follows. Take methyltrimethoxysilane $[CH_3Si(OCH_3)_3]$ having the least carbon number of organosiloxanes containing both organosilicon group and functional group OR bound to Si—O bond for instance. The silicon content of this compound is 20.6% by weight when calculated as Si and 44.1% by weight when calculated as $SiO_2$. With ethyltriethoxysilane $[C_2H_5Si(OC_2H_5)_3]$ having two carbon atoms per group has a silicon component content of 14.6% by weight in terms of Si and 31.2% by weight in terms of $SiO_2$. Organosiloxanes of the foregoing general formula (1) wherein $R^1$ to $R^6$ have more carbon atoms contain a lower silicon component content. It is difficult to expect those compounds which have a silicon component content of less than 50% by weight calculated as $SiO_2$ to provide good incombustibility or fire retardance and heat resistance.

In order to increase the silicon component content of organosiloxane to 50% by weight or more, preferably 53% by weight or more, in terms of $SiO_2$, it is necessary to polymerize organosiloxane to the degree of oligomer or more than that to thereby decrease the content of organic group, i.e., to prepare organosiloxane represented by the foregoing general formula (1) wherein n of [≡Si—O—]$_n$ is at least two. For example, a dimer obtained by subjecting 2 mols of the methyltrimethoxysilane having a SiO$_2$ content of 44.1% by weight to condensation reaction with methyl alcohol being eliminated, has a silicon content of 24.7% by weight in terms of Si and 53.0% by weight in terms of SiO$_2$. Thus, it is seen that condensation reaction Yields a product having an increased silicon content.

On the other hand, if n becomes too large, liquid viscosity of the organosiloxane increases so much that it becomes difficult to ensure good workability as a coating composition without a diluent such as an organic solvent. Therefore, there is naturally an upper limit as to the silicon component content or the polymerization degree to ensure good liquid state and a good workability.

An important feature of the organosiloxane of the present invention is that organic groups are directly bound to silicon atoms not through oxygen atom as is different from inorganic polymer containing siloxane bonds. In particular, it is important for the organosiloxane to have organosilicon moieties having sufficiently sized organic groups (e.g., an alkyl group, a phenyl group, a glycidoxy group, a methacryloxy group, etc.) to protect the siloxane bonds for the purpose of effectively exhibiting water-repelling properties, water impermeability and alkali resistance which inorganic siloxane polymers do not possess.

Considering that conventional inorganic and organic compounds having Si—O bonds have a poor alkali resistance, it is quite surprizing that the cured polymer products in accordance with the present invention show excellent alkali resistance as will be demonstrated by Examples to be described hereinafter even though it contains Si—O bonds.

Reasons for this excellent alkali resistance are not clear but may be presumed as follows. That is, as has been described hereinbefore, (1) the polymeric cured product of the present invention has a dense, strong network structure formed by the specific cross-linking reaction, and (2) Si—O bond has an average area of about 22 Å$^2$, whereas —CH$_3$ bond, for example, has an average area of about 12 Å$^2$, thus two —CH$_3$ bonds at the least fully covering and protecting one Si—O bond. Therefore, the polymeric cured product of the present invention presumably exhibits excellent water repelling properties and water impermeability.

From the above-described point of view, it is important in the present invention to find conditions to produce organopolysiloxane in a proper liquid state having a SiO$_2$ content of 50% by weight or more. For this purpose, it is important to suppress the polymerization degree at a low-molecular condensate level and to select a compound having a fewer number of organic groups bound to silicon and having organic groups containing a fewer number of carbon atoms.

As a result of intensive investigations and repeated experiments on structural formula, degree of condensation and various properties of the starting organosiloxane in order to control the silicon component content and liquid state of the organosiloxane, the inventors have found the special conditions specified in the present invention, thus having completed the present invention based on the findings.

It is of importance that Si—O bonds of the liquid organopolysiloxane forming a skeleton of the polymeric cured product of the present invention are to some extent in the form of —Si—O—Si— bonds, which serves to enhance SiO$_2$ content and expect structure of the resulting polymeric cured product capable of exhibiting useful properties. As a liquid organopolysiloxane forming —Si—O—Si— bonds as a result of certain condensation, oligomers or low molecular weight liquid polymers represented by the foregoing general formula (1) wherein n represents 2 or more are preferably used in the present invention.

The inventors have further found that a composition obtained by dispersing or dissolving previously prepared high molecular silicone resin powder in the above-described liquid organosiloxane, particularly a silane compound, can be preferably used as a paint-like mixture. In this case, the liquid viscosity of a resulting composition can be adjusted in an increasing direction, and a structure of the resulting polymeric cured product and characteristic properties thereof can be previously designed.

The inventors have further found that a liquid composition containing dissolved therein a thermoplastic resin composed of a linear organic polymer compound soluble in the liquid organosiloxane in an amount of up to 30% by weight is also favorably used as a coating composition. Addition of the organic polymer compound leads to a decrease in concentration of the metallic element component, with incombustible or fire-retardant properties tending to deteriorate. However, the polymer compound contributes to improvement of the compatibility of the composition with organic substances, which serves to improve adhesion to an organic object.

Additionally, as other means for increasing the silicon component content in the polymeric cured product of organosiloxane, it may be considered to add, to the starting organosiloxane, colloidal or finely powdered solid silica or silicate. In this case, however, silica or silicate added to the organosiloxane cannot be expected to react with the organosiloxane to form one compound and to constitute part of the siloxane bonds of the polymer to be formed. That is, silica or silicate forms only a mixture, and fails to impart improved incombustible or fire-retardant properties and heat resistance to a product coated with the composition unless a cured polymer matrix itself has enough incombustible or fire-retardant properties.

As has been described with respect to prior the, mechanism of the formation of high molecular polymer having film forming and adhesive properties from an organopolysiloxane liquid mixture at ordinary temperature is based on so-called moisture-curing mechanism wherein silanol groups of the organosiloxane or hydroxyl groups produced by hydrolysis of part of the alkoxy or acyloxy groups of the organosiloxane undergo a condensation reaction such as dealcoholation, deoximation, elimination of acetic acid with the functional groups (e.g., alkoxy groups) in the presence of a cross-linking agent of organometallic compound, water (moisture) and a curing catalyst of metal-containing organic compound. Critical conditions for the polymer formation at ordinary temperature are described below by reference to the case of using an organosiloxane wherein the organic group, R, is methyl group (CH$_3$—) containing the least number of carbon atom.

Liquid organopolysiloxane (A): Methylmethoxysilane oligomer [R$^1$-R$^3$ in the formula (1): —CH$_3$; other R's: —OCH$_3$; n: 8]

Cross-linking agent (B): Methyltrimethoxysilane [$R^1$ and $R^7$ in the formula (2): —$CH_3$; m: 1]

Curing catalyst (C): Dibutyltin dilaurate

The above-described liquid mixture composition seemingly undergoes the following steps: (1) when in contact with moisture, methoxy groups (—$OCH_3$) having some polar tendency of the methylmethoxysilane oligomer is hydrolyzed to silanol groups (Si—OH) with the production of methyl alcohol; (2) the silanol groups of the methylmethoxysilane oligomer in turn react with the methoxy groups of the cross-linking agent (B) of methyltrimethoxysilane with the catalytic aid of dibutyltin dilaurate to eliminate methyl alcohol; (3) this condensation reaction with eliminating methyl alcohol forms polymeric —Si—O—Si—bonds, thus cross-linkage of the methylmethoxysilane oligomer is completed; and (4) these steps (1), (2) and (3) continuously proceed in various sites where the functional groups exist to form a three-dimensional, network structure polymer having a main chain of siloxane bonds.

As can be seen from the polymer formation mechanism described above, formation of the polymeric cured product of the present invention at room temperature using the organopolysiloxane solution can be attained only by properly selecting and controlling formulation and kind of liquid organopolysiloxane and organometallic compound (cross-linking agent), particularly formulation and kind of organosilicon group, hydroxyl group, alkoxy group and acyloxy group, content of silicon component, polymerization degree, preliminary step of removing moisture, catalytic powder of metal-containing organic compound, etc.

It is effective for the formed polymer to have a dense, strong, three-dimensional network structure for obtaining cured products with good and useful properties. However, a cross-linking agent having only two or less functional groups yields only a linear polymer or causes polymerization only at the terminal functional group of the polymer, thus failing to form an effective, three-dimensional network polymer. In order to form a dense, tough, three-dimensional polymer, it is necessary to use a cross-linking agent having at least three functional groups and cause the cross-linking reaction at many sites of the matrix polymer to form a three-dimensional structure wherein polymer chains extend in all directions.

As can be seen from the above description, the cross-linking agent performs important functions in completing the present invention. As such cross linking agents, organometallic compounds having functional groups of —OR and represented by the general formula (2) of [$R^7_p$N (OR$^1$)$_{3-p}$] or the general formula (3) of [$R^7_m$Q (OR$^1$)$_{4-m}$] (wherein N represents a trivalent aluminum or boron, Q represents a tetravalent silicon, titanium or zirconium, $R^1$ represents a hydrogen atom, a $C_1$-$C_5$ alkyl group, an acyl group or an oxime group, $R^7$ represents a hydrogen atom, a group of OR$^1$ or a monovalent hydrocarbyl group, p represents an integer of 1 or 2, and m represents an integer of 1,2 or 3).

It is an important feature of the cross linking agent (B) of the present invention that aluminum, boron, silicon, titanium or zirconium in the organometallic compound is directly bound to Si—O bond constituting a cured polymer to be formed, thus performing functions as a constituent member of the resulting polymer. Partial presence of these trivalent or tetravalent metal elements having sizes different from that of silicon in the main polymer chains of Si—O bonds serves to change the structure of the cured product from a completely regular structure to a partially irregular structure, which imparts an effective space to the structure of the cured product. This space gives the cured product an enough toughness. This fact is quite important in attaining the objects of the present invention.

It is another important feature of the cross linking agent (B) of the present invention that, as will be described in more detail hereinafter, the cross-linking agent (B) of organometallic compound containing aluminum, boron, titanium or zirconium functions both as a cross-linking agent and as a curing catalyst. Therefore, selection of the cross-linking agent (B) must be made in full consideration of the kind and amount of the curing catalyst (C) to be described hereinafter.

A fundamental difference between the organosiloxane composition of the present invention and the inorganic siloxane composition such as water glass is that the organosiloxane composition does not have any alkali metal components. In addition, alkyl groups or the like having participated in the condensation reaction are eliminated from the siloxane bonds as alcohols and vaporize away from the cured system. As a result, troubles caused by the remaining alkali components with the inorganic siloxane composition can be avoided. In addition, the density around Si—O bonds of organosiloxane composition is less than that of the inorganic composition, and Si—O bonds in the former have higher freeness and therefore higher flexibility. Thus, the cured polymer product of the present invention has a higher flexibility and can follow bending movement of the substrate to which the cured product is applied.

Thus, with respect to formation of a dense, tough polymer, the present invention provides the following advantages: (1) there is provided a polymer having enough incombustibility or fire retardance, and excellent adhesion properties; (2) there is provided a polymer having excellent water repellence and water impermeability owing to partial existence of organosilicon group in the polymer; (3) The —Si—O— bond-based polymer exhibits excellent flexibility; and (4) the polymer has excellent adhesiveness to various substrates including organic substrates.

An important advantage of the composition of the present invention is that it can be stored in a one-pack state even in the copresence of a curing catalyst. The composition of the present invention may of course be in a two-pack form but, from the viewpoint of ease in application, a one-pack type is desirable. In order to permit one-pack form, R of the group OR in the starting liquid organopolysiloxane must be organic groups such as alkoxy group and acyloxy group which can stably exist even in the presence of a curing catalyst.

If R of the group OR in the starting liquid organopolysiloxane includes hydrogen atom, or if the organopolysiloxane has so-called silanol groups, the OH group of the silanol group causes condensation reaction with coexistent alkoxy groups or acyloxy groups to eliminate alcohol in the presence of a curing catalyst even in the absence of water, thus the raw liquid being polymerized. As a result, such composition cannot be stored in a one-pack form and requires difficult quality control.

In applying the composition of the present invention as a coating composition, fillers such as colorants or pigments must be compounded therein in a uniformly dispersed state. The organosiloxane composition, which essentially has moisture-curing property, cannot be compounded with necessary colorants or pigments in an open state where the composition is exposed to moisture.

However, the inventors have found the phenomenon that the condensation reaction can be suspended even in the presence of a curing catalyst in the system by subjecting the composition to a preliminary treatment at a temperature of 100° C. or less to thereby completely remove silanol groups and moisture contained in the organosiloxane itself or in the fillers, thereby gelation and curing being extremely depressed. Procedures of dispersing and mixing fillers such as colorants and pigments into the organosiloxane composition, which have been difficult in the prior art, can be easily conducted utilizing the above-described phenomenon.

After being applied to an object, the one-pack type composition is required to initiate the polymerization to form the intended high-molecular cured product. Since polymerization of the composition of the present invention containing the curing catalyt(C) initiates when the composition is exposed to moisture-containing atmosphere or to water, formation and filming of the cured polymeric product having a tough, three-dimensional network structure can be completed by a general coating procedure to thereby expose it to the atmosphere.

As the curing catalyst (C) for accelerating the above-described cross-linking reaction, metal-containing organic compounds containing a metal such as zinc, cobalt, aluminum or tin are effective. In the present invention, the cross-linking agent (B) of organometallic compound also functions as a curing catalyst as well as a cross-linking agent. Therefore, the amount of curing catalyst (C) must be decided in consideration of this point.

The inventors have examined the possibility of previously blocking the curing catalyst (C) so as to ensure stable storage of one-pack type composition and enable one to control progress of the curing reaction after application of the composition. The blocking agent to be used for this purpose is required to satisfy the following conditions: (1) it must stably exist in a liquid organosiloxane containing a metal component of silicon in a content of 50% by weight or more in terms of $SiO_2$; (2) it should not decompose the metal-containing organic compound in the organosiloxane composition during storage thereof; and that (3) it should allow the blocked curing catalyst to exhibit its curing function by some condition upon application of the composition.

The inventors have found that keto-enol type tautomer compounds and alcohols are effective as the blocking agents capable of meeting the above-described requirements.

In general, keto-enol type tautomer compounds have the property of being in an equilibrium state between keto form (ethyl β-ketobutyrate) and enol form (ethyl β-hydroxycrotonate). The keto-enol type tautomer compounds seem to exhibit the blocking effect since they undergo chelation based on intramolecular hydrogen bond and difficulty form intramolecular hydrogen bond and scarcely cause intramolecular association.

Keto-enol tautomer compounds in an enol form are considered stable due to chelation by a hydrogen bond. In the copresence of a compound having a hydroxyl group such as water, alcohol or acetic acid, this hydroxyl group is liable to form a hydrogen bond with the oxygen atom of the keto type carbonyl group, thus chelation of the metal element being inhibited.

Therefore, it may be presumed that the keto-enol type tautomer compounds lose the blocking effect in the copresence of hydroxyl group, and the metal-containing compound initiates its essential catalytic action. Upon initiation of the condensation reaction of organosiloxane in accordance with the present invention by the action of water, alcohols are produced as by-products in the system as has been described hereinbefore. The by-product alcohols in turn deblock the catalyst to perform its catalytic action.

In the present invention, it is also effective to compound a monohydric or polyhydric alcohol in order to delay the curing reaction rate. Though reasons for this fact are not clear, it may be presumed that the coexistent alcohols depress the dealcoholation reaction to thereby delay the reaction rate.

As has been described hereinbefore, the solvent-free, one-pack type liquid composition constituted by the liquid organopolysiloxane (A), cross-linking agent (B) and curing catalyst (C) initiates the curing reaction immediately when exposed to the moisture-containing atmosphere by coating or like procedure to form,a high molecular cured product. The reaction proceeds well at ordinary temperatures but, when exposed to moisture at an elevated temperature of up to 300° C., preferably up to 250° C., the composition can form the cured product with no damage, with the reaction rate being accelerated. Therefore, when factory lines are limited as to space and time, the curing reaction under heating is recommendable.

The thus formed product of the polymer of the present invention can find wide applications as is the same with general high molecular compounds which are used to form a film, binder or matrix for constituting a structure.

In particular, the organosiloxane liquid composition of the present invention can easily form a transparent film by moisture curing at ordinary temperature. The transparent film formed by the polymer having siloxane bond main chain has useful properties such as good weatherability, good heat resistance, good alkali resistance, good water impermeability, and good flexibility, and therefore, is effectively usable as transparent or protective coating for organic or inorganic, various materials or substrates.

Further, the solvent-free, one-pack type curing composition of the present invention can be previously compounded with an activating agent, a filler, a pigment or a colorant in predetermined amounts in accordance with a particular end-use to form a composite cured product when subjected to moisture-curing conditions. This composite cured product has a heat resistance against 250° C. or higher heat, good weatherability, good alkali resistance, good water impermeability and good flexibility, and therefore can effectively be used as coating materials for various materials and substrates, paints, protective coating materials, binders, sealing agents, anchoring agents, cementing materials, etc.

Still further, the solvent-free, one-pack type curing composition of the present invention having previously been compounded with an activating agent, a filler, a pigment or a colorant in a specific amount may further be compounded with a reinforcing material, an aggregate, a molding or the like to form a composite cured product wherein the additive is unified with the matrix polymer having main chain of siloxane bonds. The cured composite product has a heat resistance against 250° C. or higher heat, good weatherability, good alkali resistance, good water impermeability and good flexibility, and is therefore effectively used as a building material, solid product of various substrates, or structure.

The liquid organopolysiloxane (A) is a base matrix of the cured polymeric product of the present invention. Therefore, the content of liquid organopolysiloxane (A) is important with respect to workability of the composition and properties of a resulting cured product.

X in the organosilicon group (X—Si) of the liquid organopolysiloxane to be used in the present invention is a hydrogen atom or a monovalent hydrocarbyl group having 1 to 5 carbon atoms, and is preferably a straight or branched alkyl group, a fluoroalkyl group, a vinyl group, an allyl group, an alkenyl group, a phenyl group, a xenyl group, a naphthyl group, an aryl group, a cyclohexyl group, a cyclohexenyl group, a benzyl group, or an aralkyl group, aralaryl group, an epoxy group.

The liquid organopolysiloxane (A) meeting the above-described requirements has a slicon content as high as possible, possesses a good liquid state suited for conducting coating or like work, and enables to impart intended properties, particularly good water repellence, good alkali resistance and good water impermeability. When X represents an alkyl group of methyl or ethyl group or a phenyl group, there results a polymeric cured product having excellent heat resistance and adhesion properties.

On the other hand, the functional side chain of OR in the liquid organopolysiloxane (A) is important as a site from which the polymerization reaction initiates in the presence of moisture. Therefore, this OR group must be a functional group which can be hydrolyzed to form a silanol group or which can accelerate the polymerization reaction with OH of siloxane in the copresence of a curing catalyst. For this purpose, R in the OR group is preferably a monovalent alkyl group of $C_nH_{2n+1}$ or an acyl group of R—CO— (typically an acetyl group), and therefore the OR group is preferably an alkoxy group or an acyloxy group.

In the present invention, R of the OR group may be a hydrogen atom. However, when R represents a hydrogen atom to constitute a silanol group (Si—OH), this silanol group must be quenched by subjecting it to a preliminary step together with the cross-linking agent (B) for ensuring storage stability in one-pack form, as has been described hereinbefore. As the preliminary step, it suffices to keep the composition at ordinary temperature to 100° C. for at least 10 minutes in the absence of water. When the preliminary step is conducted at ordinary temperature, the system may be kept at the temperature for 24 hours or longer. During this preliminary treatment, dealcoholation reaction takes place between the silanol group and the alkoxy group, acyloxy group or like group of the cross-linking agent, thus the silanol group being quenched.

In order to impart enough incombustibility or fire retardance to the cured polymer, it is necessary to adjust the content of Si—O bond unit to a level as high as 50% by weight or more. This can be attained by selecting, as organopolysiloxane (A), an oligomer or polymer represented by the general formula (1) wherein n of [≡Si—O—]$_n$ moiety is a number of 2 or more. However, if polymerization degree of the organopolysiloxane (A) becomes too large, it becomes difficult to obtain liquid organopolysiloxane. Therefore, n in the foregoing general formula (1) is preferably less than 15. Organopolysiloxanes of such polymerization degree provide a viscosity of not more than 3,000 cps which serves to ensure easy handling of the composition and which eliminates the necessity of dilution with a diluent such as an organic solvent. This technique contributes to the provision of the solvent free organosiloxane composition.

In order to design a cured polymer product having a skeleton adapted to a particular end-use, it is advantageous to select an organopolysiloxane having a fundamental skeleton derived from a compound with a certain polymerization degree and having functional side chain of OR, as the organopolysiloxane (A). As such organopolysiloxane, that which is constituted by D units having two functional groups or T units having three functional groups or by a combination thereof, which has side chains of methyl group and/or phenyl group, and which is a polymer wherein n of the moiety of [≡Si—O—]$_n$ is at least 2 is suitable. The upper limit of n may be increased to such degree that the polymer is in a liquid state. As a general guide, low molecular polysiloxane compounds having a molecular weight of the order of $10^2$ to $10^5$ are preferred.

In the present invention, powdery silicon resin may be used. In this case, however, it is necessary to dissolve the powdery silicon resin in a liquid organosiloxane, since the composition of the present invention is intended to be handled in a liquid state. It is important to compound the silicon resin in the starting organosiloxane in an amount of up to 50% by weight, preferably up to 45% by weight for ensuring good workability. Since the silicon resin tends to contain silanol group in a content of 3 to 8% by weight, the solution must be subjected to the preliminary step to previously block and modify the silanol group for obtaining a one pack type composition.

As to organic side chains (R) including OR of the functional side chain of liquid organopolysiloxane (A), the ratio of R/Si (wherein Si represents Si—O bond) is preferably in the range of from ⅓ to 2/2 from the standpoint of keeping SiO$_2$ content at a high level and allowing the polymerization reaction to effectively proceed to form an intended cured polymer product.

As typical examples of liquid organopolysiloxane (A) favorably used in the present invention, there may be illustrated methylmethoxysiloxane oligomers, silicon resins of ⅓ to 2/2 in R/Si ratio having alkyl groups, fluoroalkyl groups, vinyl group, allyl group, alkenyl groups, phenyl group, xenyl group, naphthyl group, aryl groups, cyclohexyl group, cyclohexenyl group, benzyl group, aralkyl groups, aralaryl groups, epoxy groups, etc. and, particularlY, silicon resins having a methyl or phenyl group, tetramethyl- or ethylorthosilicate oligomers, methyl- or vinyltriacetoxysilane oligomers, and the like. These compounds may be used alone or in combination of two or more.

Furthermore, in order to improve the adhesive properties to organic materials and to slightly modify the composition to be more adapting the adapted as a paint, a thermoplastic resin may be allowed to exist in the organosiloxane in a dissolved state. As such a thermoplastic resin, a linear organic high molecular compound having carboxyl groups and capable of being dissolved in the organosiloxane is preferred. Specifically, there may be selected an acrylic resin, a polystyrene resin, a polyethylene resin, a polyvinyl chloride resin, cellulose or like resin, derivatives thereof, and copolymers thereof with an unsaturated carboxylic acid formed in a non-aqueous solvent. Illustrative of monomers for the resin are ethylene, propylene, butadiene, isoprene, chloroprene, styrene, vinyl acetate, vinyl propionate, vinyl ether, vinyl chloride, vinylidene chloride, methyl or ethyl acrylate and an acrylic ester, and illustrative of the unsaturated carboxylic acid are acrylic acid, methacrylic acid, crotonic acid, itaconic acid and maleic anhydride.

In order to complete a dense, three-dimensional network structure from the liquid organosiloxane composition, it is necessary to form cross-linkage between intermediate sites of polysiloxane molecules as well as linkage at the terminus of polysiloxane molecules. A cross-linking agent (B) which functions to form such cross-linkage in all directions is necessary for this purpose. Such a cross-linking agent is required to have the functional group of OR which can react with the silanol group in the copresence of a curing catalyst (C) and is a liquid organic compound containing trivalent aluminum or boron and represented by the general formula (2) of $[R^7_pN(OR^1)_{3-p}]$ or a liquid organic compound containing tetravalent silicon, titanium or zirconium and represented by the general formula (3) of $[R^7_mN(OR^1)_{4-m}]$.

Typical examples of the cross-linking agent are shown below.

As examples of the cross-linking agent represented by the general formula (2) wherein N represents an aluminum element, those organometallic compounds wherein p represents O and $R^1$ represents an isopropyl group or a sec-butyl group are preferred. When N represents a boron element, those organometallic compounds wherein p represents O and $R^1$ represents a methyl group, an ethyl group or a butyl group are preferred.

When Q in the general formula (3) represents a silicon element, those organometallic compounds wherein $R^7$ represents a methoxy group or an ethoxy group, such as tetramethylorthosilicate, tetraethylorthosilicate, methyltrimethoxysilane, methyltriethoxysilane, vinyltriacetoxysilane, vinyltrimethoxysilane, phenyltrimethoxysilane, δ-glycidoxypropylmethoxysilane, dimethylmethyltrifluoropropylsilane, etc. are preferred.

When Q in the general formula (3) represents a titanium element, such organometallic compounds as tetra-i-propyltitanate, tetra-n-butyltitanate, etc. are preferred and, when Q in the general formula (3) represents a zirconium element, such organometallic compounds as tetraethylzirconate, tetra-i-propylzirconate, tetra-n-butylzirconate, etc. are preferred.

These organometallic compounds are preferably in the form of monomers in view of attaining sufficient cross-linking effect, but they may partly be in a polymerized form of dimers or the like. The organometallic compounds may be used alone or in combination of two or more according to the end use and workability. The cross-linking agent (B) of the present invention is advantageously compounded in the composition in an amount of 50% by weight, preferably 45% by weight, based on the liquid organopolysiloxane (A).

Since the cross-linking agent (B) is an organometallic compound, care must be taken to the fact that the cross-linking agent functions as a curing catalyst as well as a cross-linking agent. Therefore, the compounding amount of the organometallic compound, particularly, the aluminum-, boron-, titanium- or zirconium-containing organic compound, is desirably limited to up to 25% by weight based on the composition of the present invention, though it depends upon the kind and amount of the curing catalyst (C) of the present invention. The composition containing the cross-linking agent in such an amount shows good one-pack storage properties and sufficient curing rate and facilities control of produced film properties.

The curing catalyst (C) to be used in the present invention is preferably selected from the group consisting of organometallic compounds containing zinc, cobalt, aluminum or tin and mixtures thereof. Needless to say, care must be taken to the point that, as is described above, the cross-linking agent (B) of titanium- or zirconium-containing organic compound also functions as a curing catalyst. Specific examples of the metal-containing curing catalyst C) are illustrated below. That is, known general curing catalysts such as zinc naphthenate, cobalt octate, cobalt naphthenate, aluminum trimeate, aluminum di- or tris(acetylacetonate), aluminum tri-n-butoxide, diacetyltin diacetate, dibutyltin dilaurate, dibutyltin diacetate, dioctyltin dilaurate, diacetyltin dioctoate and tin octate may be used.

One of the important features of the present invention is that the curing catalyst (C) is previously blocked by a ketoenol type tautomer compound to thereby ensure long storage stability of the composition of the present invention in a one-pack form, said composition comprising a ternary mixture solution of liquid organopolysiloxane (A), cross-linking agent (B) and curing catalyst (C).

The keto-enol tautomer compound is a compound which is in an equilibrium state between keto form and enol form as has been described hereinbefore, and which undergoes intramolecular chelation based on hydrogen bond. A typical example of the tautomer compound is ethyl acetoacetate, which is preferably used in the present invention. Other examples of the keto-enol tautomer compound include malonic acid diesters, β-diketones (e.g., acetylacetone), benzoylacetone, dibenzoylmethane, ketones having a hydroxyl group in β-position (e.g., diacetonealcohol), esters having a hydroxyl group at β-position (e.g., methyl salicylate), and derivatives of the above-described compound wherein said alkyl group is constituted by a trifluoro group.

The amount of the keto-enol tautomer compound varies depending upon kind and amount of the curing catalyst (C) and curing conditions, but can easily be determined by conducting simple experiments. As a general guide, the tautomer compound is compounded in an amount of up to 50% by weight in the curing catalyst (C) to obtain effective blocking effect.

Another important feature of the present invention is that the condensation reaction rate can be retarded by compounding a monohydric or polyhydric alcohol in the curing catalyst (C). This technique enables one to control the curing rate upon formation of the cured polymer.

Examples of the reaction-retarding alcohols include monohydric alcohols such as methyl alcohol, ethyl alcohol, propyl alcohol, butyl alcohol, amyl alcohol, etc. and polyhydric alcohols such as ethylene glycol, glycerin, erythritol, etc.

The amount of the alcohol to be used for retarding the condensation reaction varies dependng upon kind and amount of the curing catalyst (C), curing conditions and degree of retarding the reaction, but can easily be determined by conducting simple experiments. As a general guide, the alcohol is previously compounded in the curing catalyst (C) in an amount of up to 50% by weight for not spoiling the catalytic action of the curing agent. In the case of using the above-described blocking agent of keto-enol tautomer compound and the reaction-retarding agent of alcohol in combination, their total amount is preferably up to 50% by weight based on the curing catalyst (C).

The amount of the curing catalyst (C) blocked with the keto-enol tautomer compound, the amount of the curing catalyst (C) compounded with the reaction-retarding alcohol, or the amount of the curing catalyst (C) independently used varies depending upon content, kind and amount of the liquid organopolysiloxane (A) or of the cross-linking agent (B) or upon content and kind of the curing catalyst. In general, however, the curing catalyst is used in an amount of 0.1 to 10.0% by weight. Particularly when an aluminum-, boron-, titanium- or zirconium-containing organometallic compound is used as the cross-linking agent (B), the amount of the curing catalyst (C) may be minimized. When the above-described compounding conditions are satisfied, the co-curing condensation reaction smoothly proceeds to produce the intended cured polymer product.

The ternary liquid composition of the present invention comprising the liquid organopolysiloxane (A), cross-linking agent (B) and curing catalyst (C) initiates the curing reaction when brought into contact with moisture. Moisture in the atmosphere is sufficient for the initiation of the reaction, but the composition may positively be brought into contact with water. Bringing the composition into contact with water may be conducted at ordinary temperature or under heating up to 300° C., preferably up to 250° C. and under pressure or degassing conditions. If necessary, it may be conducted under reduced pressure or in an atmosphere of inert gas such as a nitrogen gas. In short, it suffices to leave the composition under such conditions that the functional OR group in the liquid composition is first hydrolyzed to produce OH of the silanol group, and this silanol group in turn reacts with a remaining functional OH group to produce siloxane bond by eliminating an alcohol.

When the ternary composition of the present invention of the present invention which comprises the liquid organopolysiloxane (A), cross-linking agent (B) and curing catalyst (C) is exposed to moisture-containing atmosphere by applying it to, for example, the surface of a substrate, no harmful materials such as organic solvents are allowed to diffuse into the working environment, and when the cured polymer product is subjected to combustion, no harmful and poisonous gases are produced. Thus, the composition of the present invention can be safely used without polluting the earth environment.

Thus, the coating composition of the present invention enables one to coat various substrates with a transparent cured polymer, and can provide the formerly defined transparent film, coating material, binder, etc.

In the case of protecting the surface of a substrate from physical energy such as heat or ultraviolet rays or from various ambient conditions (e.g., acids, alkalis, salts, etc.) without hiding the surface, the cured polymer in accordance with the present invention can be used as a protective, transparent film. Since the thus formed film has enough flexibility, it can follow deflections or flex actions of the substrate, and is effective as a coating film for various substrates which are required to be deflected or flexed.

The organosiloxane composition of the present invention may be compounded with a powdery activating agent, filler, pigment or colorant having a size of up to 200 microns according to particular properties, functions, workability, end-use, etc. of the cured product.

These fillers may be compounded in amounts not spoiling the workability and properties of the organosiloxane composition. In general, the fillers may be added in amounts of 1 to 400 parts by weight per 100 parts by weight of the ternary composition containing organopolysiloxane as a major component. Practically, one or more of the fillers may be previously compounded in the organosiloxane composition and, upon formation of cured polymer, there results a composite cured product. This technique is partly described below.

As the activating agents, powdery products of a boric acid-containing compound, a chromic acid-containing compound and a phosphoric acid-containing compound may be employed. The organosiloxane composition containing therein the activating agent tends to show an improved adhesive properties to, for example, a substrate of metal such as iron. As the boric acid-containing compound, chromic acid-containing compound and phosphoric acid-containing compound, there may be used powders of borosilicate glass, zinc borate, boron phosphate, an alkaline earth metal salt of boric acid, an alkali metal salt of boric acid, zinc chromate, strontium chromate, lead chromate, silicon phosphate, aluminum phosphate, zinc phosphate, an alkaline earth metal salt of phosphoric acid, etc. or modified products thereof.

As the fillers, a proper one may be selected from among powders of metals such as stainless steel, silicon, zinc, aluminum or iron or alloys thereof, glass powder, pottery powder, diamond powder, silicon oxide (e.g., siliceous sand powder, silica powder, fumed silica, etc.), powder of fused alumina, powder of magnesia, calcium carbonate, zircon sand, various clays (e.g., purified product of bentonite, smectite, kaolin, woody clay, etc.), baked clays (e.g., bauxite, montmorillonite, kaolin, etc.), gypsum, calcium phosphate, magnesium phosphate, barium sulfate, aluminum fluoride, calcium silicate, magnesium silicate, barium silicate, barium carbonate, barium hydroxide, aluminum silicate, glazing compositions having various formulations, and powders of up to 200 microns in size selected from powders of talc, mica or fly ash.

As the pigments, inorganic pigments such as titanium dioxide, red iron oxide, chromium oxide, chrome yellow, carbon black and ultramarine, baked pigments composed of metal, alloy or oxide, inorganic functional pigments such as silica white carbon, alumina, zinc oxide, magnetic iron oxide, boron nitride, silicon nitride and various clay powders, and organic pigments may be used depending upon the end-use.

As the colorants, the above-described inorganic pigments may also be used but, since the organosiloxane of the present invention has organic groups, organic pigments and dyes known and widely used in the art may be used alone or in combination to impart a desired hue to the cured polymer of the present invention.

The above-described fillers may be used alone or in combination of two or more in full consideration of size distribution, shape, pore volume, specific surface area, water absorption capacity, oil absorption capacity, etc. suited for the particular end-use of the organosiloxane composition. Fillers of desired properties can be obtained by grinding, classification, mixing, baking, purification or like procedure.

As has been described herein before, moisture contained in these fillers might cause a condensation reaction with the moisture-curing, typed organosiloxane to spoil the liquid state of the organosiloxane composition of the invention. Therefore, in the case of using fillers, most of the moisture contained by them must be removed by a previous heating or dehydrating treatment, and the filler-containing composition must be subjected to the preliminary step of maintaining it at ordinary temperature to 100° C. for a predetermined period of time. With some working conditions and some end-uses, these fillers may be subjected to surface treatment with a coupling agent or a surfactant.

The organosiloxane composition of the present invention may previously be compounded surfactants such as fluorine containing ones, various organic compounds, resins and, if necessary, solvents in amounts not sacrificing the favorable properties and workability of the composition for the purpose of improving dispersibility, impregnation property, anti-foaming property, fluidity, coating property, etc.

Mixing of the organosiloxane mixed solution of the present invention with the above-described fillers must be conducted under moisture- or water-free condition. Otherwise, the curing reaction of the organosiloxane composition might be initiated. Thus, the mixing step must be conducted in a dry air or under reduced pressure. Alternatively, the fillers may be mixed with the organosiloxane before the curing catalyst is added thereto, then the resulting mixture is subjected to the preliminary step, and finally the curing catalyst (C) is added in a predetermined amount.

Mixing manner varies depending upon the contents or end-use of the organosiloxane composition, but may be conducted by properly selecting a mixer employed in civil engineering, cement industry, concrete industry, paint industry, food industry, chemicals-producing industry, etc., such as a mortar mixer, a stirrer, a mixer, a roll, a homogenizer or the like for obtaining a homogeneous, liquid, pasty or mortar-like mixture. Materials to be mixed (liquid or powdered form) may previously be cooled or heated before use in consideration of weather conditions or environmental conditions upon working, for example, in consideration of the season (summer or winter).

In coating work, protective coat-forming work, adhesion work, fixing work, unifying work, anchoring work or like work, the mortar-like, pasty or liquid organosiloxane composition thus prepared in a homogeneous state may be applied automatically or manually according to known methods generally employed in the art such as a spray coating method, brushing method, roller coating method, trowel coating method, curtain coating method, dip-coating method, cast coating method, piling method, patching method or the like. In some end-uses, conditions or applying methods, it is of course possible to conduct wet-on-wet coating or double layer-coating wherein respective layers have different formulations.

When used as a kind of binder, the organosiloxane composition of the present invention can provide a composite cured product or structure wherein aggregates, reinforcing agents or moldings are unified to obtain desired performances, functions, etc. adapted for a particular end-use.

As the aggregates, reinforcing agents or moldings, there may be used those which have a comparatively large size of 200 microns or more or which are selected from the following materials in amounts of not spoiling the workability and favorable properties of the composition, generally 100 to 2,000 parts by weight per 100 parts by weight of the organosiloxane composition.

As the aggregates having a particle size of 200 microns or more, there may be used, for example, various aggregates of silica stone, silica sand, agalmatolite, feldspar, chamotte, mullite, alumina, dolomite, magnesia, zirconia, calcia, zircon, carbon, graphite, carbides or nitrides, various micas, asbestos, flake-like metal powder, etc. Further, artificially manufactured glass beads, hollow glass fine particles, glass flake and metal flake, pearlite, various synthetic light-weight aggregates, and powdery or granular artificial, aggregates produced from industrial waste such as slag or fly ash. Still further, wood, bamboo, vegetable fibers, flake-like or fibrous metals, inorganic fibers such as glass fibers, rock wool, natural mineral fibers or carbon fibers, and fibrous reinforcing matrials or moldings such as staple of organic fibers, texture, sliver, net, mat, woven fabric, nonwoven fabric, etc. may also be used. Yet further, honeycomb moldings formed by using the above-described aggregates or the like may also be employed.

The particle size distribution and shape of the above-described aggregates, reinforcing agents or moldings may properly be selected according to the end use or required properties. For some working conditions or end-uses, they may be previously treated with a coupling agent, a surfactant, a resin or the like.

A composite cured product or structure may be produced from these aggregates, reinforcing agents or moldings by various methods using the organosiloxane composition of the present invention as a binder. For example, the aggregates, reinforcing materials or moldings are first mixed with the organosiloxane composition of the present invention, the resulting mixture is placed in a given chase or vessel, followed by curing the organosiloxane to unify the same. Alternatively, the composition of the present invention is cast or impregnated into a chase or vessel in which the aggregates, reinforcing materials or moldings have been placed, followed by curing the organosiloxane to obtain a composite cured product. A proper method may be selected in consideration of the end-use or environmental conditions.

As can be seen from the above descriptions, the composition of the present invention can be applied to various substrates relating to daily necessities, manufacturing industry, building or civil engineering industry and service industry. Examples thereof are shown below, which, however, are not to be considered limiting.

That is, the organosiloxane composition of the present invention may be applied to the surface of parts, various structures, various apparatus, flooring, walls, blocks, flues, chimneys, furnaces and attachments thereto, roads, tunnels, bridges, building materials, buildings, etc. constituted by paper or pulp, metal (e.g., iron), alloy (e.g., stainless steel), rock, glass, gypsum, ceramics, slag, asphalt, wood or fibers or to the surface of an ingot or apparatus requiring lot marking, or may be used for unifying various fabrics, moldings, structures or honeycomb bodies.

The organopolysiloxane composition of the present invention is also advantageously usable as a material for repairing, undercoating, pre-treating, covering (a hole of), finishing, thickening or anti-slipping the above-described objects. The organosilane composition may be compounded with various ceramics, fibrous materials, grinding materials, abrasion-resistant materials or various inorganic compounds to produce composite materials meeting various requirements such as high water resistnce, heat resistance, flame resistance, acid resistance, etc. The above-described mixture can be used in a kitchen, flue, drain, building of a chemical factory, a food factory, a plating factory, a spa, as a material for solidifying various materials, materials for processing objects, adhesives, and sealers.

Furthermore, the organosiloxane composition of the present invention is also advantageously usable as a solidifying material in cast molding, as a cast-repairing material for damaged refractory furnace members, damaged chimnies, damaged boilers, damaged structures, etc. or as a cast-solidifying material for treating irregularly shaped industrial waste such as radioactive waste discharged from nuclear power plants.

Still further, the organosiloxane composition of the present invention may be used as an anchoring material for such structures as tank, tower, building, etc. or for apparatus, or as a cementing material to places where imbedding or plastic patching is required.

The present invention is now described in more detail by reference to the following examples which, however, are not to be construed as limiting the present invention in any way. Additionally, the starting liquid organopolysiloxane (A) is abbreviated as "OS-A", a binery mixture composition of the liquid organopolysiloxane (A) and the crosslinking agent (B) as "OS-AB", and the solvent-free, one-pack type, cold-setting organosiloxane composition as "OS-composition".

EXAMPLES

I Starting materials, formulation and preparation of the composition of the present invention (OS composition) 1) Starting materials of liquid organopolysiloxane (A) (OS-A) and silicon component contents thereof ($SiO_2\%$) are shown in Table 1.

TABLE 1

| No. of Starting Material | Symbol | Compound Name | $SiO_2$ (%) | Manufacturer[a] and Trade Name |
|---|---|---|---|---|
| 1 | SL-MF1 | Methyl- and phenyl-containing low molecular silicone | 55.7 | TD: DC 3037 |
| 2 | SL-MF2 | Methyl- and phenyl-containing low molecular silicone | 53.5 | TD: DC 3074 |
| 3 | SL-F | Phenyl-containing low molecular silicone | 63.5 | SS: KR 217 |
| 4 | SL-M | Methyl-containing low molecular silicone | 66.3 | TD: SR 2402 |
| 5 | SL-MFR | Methyl- and phenyl-containing high molecular liquid silicone resin | 72.8 | TD: SR 2414 |
| 6 | SR-MF | Methyl- and phenyl-containing high molecular flaky silicone resin | 76.4 | TD: DC6-2230 |
| 7 | B-MTM | Methyltrimethoxy-silane | 45.0 | TD: SZ-6070 |
| 8 | B-FTM | Phenyltrimethoxy-silane | 30.2 | SS: KBM 103 |
| 9 | C-ACR | Low molecular acrylic resin | — | MR: BR-101 |

[a]Manufacturer
SS: Shin-etsu Kagaku Kogyo
MR: Mitsubishi Rayon
TD: Toray Dow-Corning Silicone 2) Formulation of mixture of two or more liquid organopolysiloxane (A) (OS-A), silicon component content ($SiO_2\%$), and conditions of the preliminary step are tabulated in Table 2.

TABLE 2

| Sample No. | Mixed OS-A Formulation Compound | % by weight | $SiO_2$ (%) | Preliminary Step Temp. (°C.) | Time (h) |
|---|---|---|---|---|---|
| A-1 | SL-MF1 | 40 | 59.9 | 40 | 6 |
|  | SL-MF2 | 25 |  |  |  |
|  | SL-MFR | 30 |  |  |  |
|  | B-MTM | 5 |  |  |  |
| A-2 | SL-F | 52 | 54.5 | 60 | 5 |
|  | SL-MF1 | 30 |  |  |  |
|  | B-MTM | 10 |  |  |  |
|  | C-AC | 8 |  |  |  |
| A-3 | SL-MFR | 25 | 60.1 | 80 | 2 |
|  | SL-MF1 | 40 |  |  |  |
|  | SL-M | 25 |  |  |  |
|  | B-FTM | 10 |  |  |  |
| A-4 | SL-MF | 20 | 59.2 | 60 | 8 |
|  | SL-MF1 | 35 |  |  |  |
|  | SL-M | 30 |  |  |  |
|  | B-FTM | 15 |  |  |  |
| A-5 | SL-MF1 | 25 | 55.3 | 20 | 48 |
|  | SL-MF2 | 40 |  |  |  |
|  | SL-M | 20 |  |  |  |
|  | B-MTM | 15 |  |  |  |
| A-6 | SR-MF | 8 | 50.6 | 25 | 48 |
|  | SL-MF1 | 30 |  |  |  |
|  | SL-M | 25 |  |  |  |
|  | B-FTM | 37 |  |  |  |
| A-7 | SR-MF | 25 | 52.9 | 20 | 48 |
|  | SL-MF1 | 40 |  |  |  |
|  | SL-M | 20 |  |  |  |
|  | B-FTM | 15 |  |  |  |

3) Materials for cross-linking agent (B) and metal component content thereof ($MO_{y/2}\%$) are shown in Table 3.

TABLE 3

| No. of Starting Material | Symbol | Compound Name | $MO_{y/2}$ (%) | Manufacturer[b] and Trade Name |
|---|---|---|---|---|
| 1 | B-ASB | Aluminum tri-sec-butyrate | 20.7 | DC: ASB |
| 2 | B-TMB | Trimethoxy borate | 33.5 | KK: TMB |
| 3 | B-MSO | Methyl silicate oligomer | 51.0 | TM: M-51 |
| 4 | B-ESO | Ethyl silicate oligomer | 45.0 | TM: 45 |
| 5 | B-MTM | Methyl-trimethoxy-silane | 44.1 | SS: KBM 13 |
| 6 | B-MTE | Methyltriethoxy-silane | 33.6 | SS: KBE 13 |
| 7 | B-MTED | Methyltriethoxy-silane dimer | 53.1 | TD: Trial sample |
| 8 | B-BTA | Vinyltriacetoxy-silane | 25.8 | TD: SZ 6075 |
| 9 | B-DMDM | Dimethyldi-methoxysilane | 49.9 | TD: AY43-004 |
| 10 | B-CPDM | Methacryloxy-propylmethyldi-methoxysilane | 29.5 | TD: AY43-060 |
| 11 | B-FTM | Phenyltrimethoxy-silane | 30.2 | TD: AY43-040 |
| 12 | B-GTM | Glycidoxypropyl-trimethoxysilane | 25.4 | TD: SH 6040 |
| 13 | B-FFM | Trifluorotri-methoxysilane | 39.4 | TD: Trial sample |
| 14 | B-TBT | Tetra-n-butoxy-titanium | 23.5 | NS: TBT |
| 15 | B-TPT | Tetra-i-propoxy titanium | 28.2 | NS: TPT |
| 16 | B-TBZ | Tetra-n-butoxy- | 22.6 | NS: TBZ |

TABLE 3-continued

| No. of Starting Material | Symbol | Compound Name | MO$_{y/2}$ (%) | Manufacturer[b] and Trade Name |
|---|---|---|---|---|
| | | zirconium | | |

[b]Manufacturer
TM: Tama Kagaku Kogyo
SS: Shin-etsu Kagaku Gogyo
NS: Nihon Soda
CM: Commercially available product
KK: Koriyama Kasei
DC: Daihachi Kagaku
TD: Toray Dow-Corning Silicone 4) Formulations of a binary mixture composition (OS-A composition) of OS-A composition shown in Table 2 and the cross-linking agent (B) shown in Table 3 are shown in the following Table 4 together with MO$_{y/2}$ content (%).

TABLE 4

| Sample No. | Formulation of OS-A Composition Content | wt % | Cross-linking Agent Content | wt % | MO$_{y/2}$ content (%) |
|---|---|---|---|---|---|
| AB-1 | A-1 | 60 | B-FTM | 25 | 47.2 |
| | | | B-CPDM | 5 | |
| | | | B-TBT | 4 | |
| | | | B-ASB | 3 | |
| | | | B-TMB | 3 | |
| AB-2 | A-2 | 70 | B-MTE | 5 | 46.8 |
| | | | B-FTM | 15 | |
| | | | B-TBT | 5 | |
| | | | B-TMB | 5 | |
| AB-3 | A-3 | 60 | B-MSO | 15 | 54.1 |
| | | | B-GTM | 8 | |
| | | | B-MTED | 10 | |
| | | | B-TPT | 5 | |
| | | | B-TMB | 2 | |
| AB-4 | A-4 | 75 | B-ASB | 3 | 52.3 |
| | | | B-BTA | 6 | |
| | | | B-FFM | 10 | |
| | | | B-TBZ | 3 | |
| | | | B-TMB | 3 | |
| AB-5 | A-3 | 40 | B-MTED | 10 | 53.6 |
| | A-5 | 40 | B-TBZ | 5 | |
| | | | B-TMB | 5 | |
| AB-6 | A-6 | 60 | B-MTED | 20 | 48.2 |
| | | | B-DMDM | 4 | |
| | | | B-FTM | 10 | |
| | | | B-TBZ | 3 | |
| | | | B-TMB | 3 | |
| AB-7 | A-7 | 70 | B-MTED | 11 | 41.4 |
| | | | B-CPDM | 5 | |
| | | | B-FTM | 5 | |
| | | | B-TBZ | 3 | |
| | | | B-TBT | 3 | |
| | | | B-TMB | 3 | |

(5) Metal-containing organic compounds for the curing catalyst (B), blocking agents, and reaction retardants (each selected from commercially available products) are shown in Table 5.

TABLE 5

| No. | | Symbol |
|---|---|---|
| | Chemical name of curing catalyst | |
| 1 | Zinc naphthenate | C-Zn |
| 2 | Cobalt octate | C-Co |
| 3 | Aluminum tri-n-butoxide | C-BA1 |
| 4 | Tris(acetylacetonato)aluminum | C-AA1 |
| 5 | Dibutyltin dilaurate | C-SnB |
| 6 | Dibutyltindiacetate | C-SnA |
| | Chemical name of blocking agent | |
| 1 | Ethyl acetoacetate | CB-AAE |
| 2 | Malonic acid diester | CB-ME |
| 3 | Benzoylacetone | CB-BA |
| 4 | Ethyl trifluoroacetate | CB-FAF |

TABLE 5-continued

| No. | | Symbol |
|---|---|---|
| | Chemical name of retardant | |
| 1 | Methyl alcohol | CD-MA |
| 2 | Ethyleneglycol | CD-EG |
| 3 | Glycerin | CD-GL |

6) Formulations of curing catalyst (C) wherein the metal-containing organic compound, blocking agent and reaction retardant are combined are given in Table 6.

TABLE 6

| Sample No. | Metal-containing Organic Compound Kind | wt % | Blocking Agent Kind | wt % | Reaction Retardant Kind | wt % |
|---|---|---|---|---|---|---|
| C-1 | C-Zn | 50 | CB-AAE | 50 | — | — |
| C-2 | C-Co | 50 | CB-AAE | 50 | — | — |
| C-3 | C-BA1 | 50 | CB-AAE | 50 | — | — |
| C-4 | C-AA1 | 50 | CB-AAE | 50 | — | — |
| C-5 | C-SnB | 80 | CB-AAE | 20 | — | — |
| C-6 | C-SnB | 60 | CB-ME | 40 | — | — |
| C-7 | C-SnA | 60 | CB-BA | 40 | — | — |
| C-8 | C-SnA | 60 | CB-FAE | 40 | — | — |
| C-9 | C-SnB | 70 | — | — | CD-MA | 30 |
| C-10 | C-SnA | 80 | — | — | CD-EG | 20 |
| C-11 | C-SnA | 90 | — | — | CD-GL | 10 |
| C-12 | C-SnA | 65 | CB-AAE | 25 | CD-MA | 10 |

II Formulation of the organosiloxane composition, one-pack storage stability thereof, and curing conditions Formulations of the liquid organosiloxane compositions (OS-compositions), results of one-pack storage stability test according to the following testing method, and curing conditions for obtaining cured polymer products are shown in Table 7. Additionally, a comparative sample (sample No. H-1) of AB-4 (see Table 4) containing OH-having silicone resin but not having been subjected to the preliminary step, a comparative sample (sample No. H-2) not containing the cross-linking agent, a commercially available acrylic paint sample (sample No. H-3) prepared from organic compounds, and a commercially available, bake-curing type water-glass paint (sample No. H-4) were similarly evaluated.

Method of testing one pack storage stability:

A sample liquid organosiloxane composition was placed in a sealed vessel, and was left for 6 months at room temperature. Samples undergoing no change were rated as having "good" one-pack storage stability, whereas samples undergoing the phenomenon of gelation or skinning were rated as having "bad" one-pack storage stability.

Method of preparing coated test plate

A sample liquid composition was sprayed on a steel plate prescribed by JIS G 3141 in a thickness of about 25 microns according to the general paint-testing method prescribed in JIS K 5400, followed by curing in the atmosphere under the filming conditions shown in Table 7.

Method of testing surface hardness of the coating film

The test piece having been subjected to the curing conditions was subjected to the pencil hardness test prescribed in JIS K 5400, 6.14. The results thus obtained are also shown in Table 7.

TABLE 7

| Sample No. | OS-AB No. | OS-AB Parts by Weight | Curing Catalyst (C) No. | Curing Catalyst (C) Parts by Weight | One-pack Storage Stability | Filming Conditions (°C.) × (h) | Surface Hardness |
|---|---|---|---|---|---|---|---|
| S-1 | AB-1 | 100 | C-12 | 5 | good | 25 × 120 | 3H |
| S-2 | AB-2 | 100 | C-12 | 5 | good | 25 × 120 | 3H |
| S-3 | AB-3 | 100 | C-12 | 5 | good | 25 × 120 | 3H |
| S-4 | AB-4 | 100 | C-12 | 3 | good | 25 × 120 | 3H |
| S-5 | AB-5 | 100 | C-12 | 3 | good | 25 × 120 | 3H |
| S-6 | AB-6 | 100 | C-12 | 3 | good | 25 × 120 | 2H |
| S-7 | AB-7 | 100 | C-12 | 3 | good | 25 × 120 | 2H |
| S-8 | AB-3 | 100 | C-1 | 10 | good | 25 × 170 | H |
| S-9 | AB-4 | 100 | C-2 | 8 | good | 25 × 170 | H |
| S-10 | AB-4 | 100 | C-3 | 8 | good | 25 × 96 | H |
| S-11 | AB-4 | 100 | C-4 | 8 | good | 25 × 96 | H |
| S-12 | AB-6 | 100 | C-5 | 0 | good | 25 × 150 | 3H |
| S-13 | AB-4 | 100 | C-6 | 0 | good | 25 × 150 | 4H |
| S-14 | AB-5 | 100 | C-7 | 2 | good | 25 × 72 | 3H |
| S-15 | AB-5 | 100 | C-8 | 2 | good | 25 × 72 | 3H |
| S-16 | AB-5 | 100 | C-9 | 10 | good | 25 × 120 | 3H |
| S-17 | AB-4 | 100 | C-10 | 10 | good | 25 × 120 | 4H |
| S-18 | AB-4 | 100 | C-11 | 10 | good | 25 × 120 | 4H |
| S-19 | AB-6 | 100 | C-5 | 4 | good | 120 × 0.5 | 2H |
| S-20 | AB-7 | 100 | C-5 | 4 | good | 160 × 0.2 | 2H |
| H-1 | AB-4 | 100 | C-5 | 4 | bad | — | — |
| H-2 | A-1 | 100 | — | — | good | 25 × 120 | none |
| H-3 | — | — | — | — | good | 25 × 120 | 2H |
| H-4 | — | — | — | — | bad | 135 × 0.5 | 5H |

III Application as transparent film

Each of the liquid organosiloxane compositions (OS-compositions) shown in Table 7 was sprayed over a steel substrate according to the general paint-testing method described in II, followed by subjecting it to the filming conditions described in Table 7 to prepare transparent film test pieces. The test pieces were subjected to the respective tests. The test results are shown in Table 8. Additionally, a comparative sample (sample No. H-1) of AB-4 (see Table 4) containing OH-having silicone resin but not having been subjected to the preliminary step, a comparative sample (A-1; Table 2) (sample No. H-2) not containing the cross-linking agent, a commercially available acrylic paint sample (sample No. H-3) prepared from organic compounds, and a commercially available, bake-curing type water-glass paint (sample No. H-4) were similarly evaluated.

(1) Adhesion properties

6×6 cuts were made crosswise in the coat film of each sample with an interval of 1.0 mm using a cutter knife to form a grid pattern. Then, an adhesive cellophane tape was applied to the grid pattern area, followed by peeling the tape. Samples suffering no peeling or no flaws were scored as 25/25. Samples suffering peeling or flaws were scored by subtracting the number of peeled or flawed grid pieces from the numerator of 25.

(2) Heat resistance

Heat resistance was determined according to the coat-heating test described in JIS K 5400, 7.1. That is, each sample was placed in a 250° C. electrical furnace for 20 minutes, then taken out of the furnace and allowed to cool at room temperature. Samples suffering no blisters, cracks and peeling were scored as having "good" heat resistance.

(3) Incombustibility

Incombustibility was determined according to the coat-heating test described in JIS K 5400, 7.1. That is, each sample was placed in a 500° C. electrical furnace into which enough oxygen was supplied. Samples showing no self-burning properties were scored as having "good" incombustibility.

(4) Water impermeability

Each of the sample compositions was applied to Toyo filter paper No.6, and the thus-prepared test piece was applied to a funnel of gravity filtration. Water was poured into the funnel, and an amount of water passing through the sample was determined. Samples not allowing water to pass therethrough were scored as having "good" water impermeability.

(5) Acid resistance

Acid resistance was determined according to the coat-heating test described in JIS K 5400, 7.5. That is, each test piece prepared by coating the composition on a glass plate was dipped in a 20° C., 5 wt % sulfuric acid solution for 30 days. Samples suffering no blisters, bubbles, peeling, holes, softening and dissolution were scored as having "good" acid resistance.

(6) Alkali resistance

About 5 cc of a 5 wt % sodium hydroxide (NaOH) solution was placed on each of the test piece with covering it by a watch glass to prevent vaporization of the solution. After being allowed to stand at room temperature for 24 hours, the coated surface was washed and observed. Samples undergoing no changes were scored as having "good" alkali resistance.

(7) Deflection resistance

Each sample was deflected around a round shaft of 10 mm $\phi$ using a deflection tester described in JIS K 5400, 6.16. Samples showing no abnormality were scored as having "good" resistance against deflection.

(8) Weatherability (weatherometer)

Each test sample was subjected to irradiation-dropwise condensation cycle for 2500 hours at 55±15° C. using a weatherometer of model QUV (280 to 320 nm in wavelength region). Gloss of each sample was measured before and after the irradiation. Samples showing a gloss reduction (%) within 10% were scored as having "good" weatherability.

Comparison of the results of test pieces of the present invention with that of the comparative test pieces well reveals that the liquid organosiloxane compositions of the present invention have enough one-pack storage stability and, after being applied to a substrate, form a transparent cured film due to moisture curing, and that the thus-formed transparent film has better heat resistance, acid resistance, deflection resistance and weatherability than the comparative test pieces.

TABLE 8 (A)

| Sample No. | Adhesion Properties | Heat Resistance | Incombustibility | Water Impermeability |
|---|---|---|---|---|
| S-1 | 25/25 | good | good | good |
| S-2 | 25/25 | good | good | good |
| S-3 | 25/25 | good | good | good |
| S-4 | 25/25 | good | good | good |
| S-5 | 25/25 | good | good | good |
| S-6 | 25/25 | good | good | good |
| S-7 | 25/25 | good | good | good |
| S-8 | 25/25 | good | good | good |
| S-9 | 25/25 | good | good | good |
| S-10 | 25/25 | good | good | good |
| S-11 | 25/25 | good | good | good |
| S-12 | 25/25 | good | good | good |
| S-13 | 25/25 | good | good | good |
| S-14 | 25/25 | good | good | good |
| S-15 | 25/25 | good | good | good |
| S-16 | 25/25 | good | good | good |
| S-17 | 25/25 | good | good | good |
| S-18 | 25/25 | good | good | good |
| S-19 | 25/25 | good | good | good |

TABLE 8 (A)-continued

| Sample No. | Adhesion Properties | Heat Resistance | Incombustibility | Water Impermeability |
|---|---|---|---|---|
| H-2 | 14/25 | bad | good | good |
| H-3 | 25/25 | bad | bad | good |
| H-4 | 25/25 | good | good | bad |

TABLE (B)

| Sample No. | Acid Resistance | Alkali Resistance | Deflection Resistance | Weatherability |
|---|---|---|---|---|
| S-1 | good | good | good | good |
| S-2 | good | good | good | good |
| S-3 | good | good | good | good |
| S-4 | good | good | good | good |
| S-5 | good | good | good | good |
| S-6 | good | good | good | good |
| S-7 | good | good | good | good |
| S-8 | good | good | good | good |
| S-9 | good | good | good | good |
| S-10 | good | good | good | good |
| S-11 | good | good | good | good |
| S-12 | good | good | good | good |
| S-13 | good | good | good | good |
| S-14 | good | good | good | good |
| S-15 | good | good | good | good |
| S-16 | good | good | good | good |
| S-17 | good | good | good | good |
| S-18 | good | good | good | good |
| S-19 | good | good | good | good |
| H-2 | good | bad | good | good |
| H-3 | good | good | good | bad |
| H-4 | good | bad | bad | bad |

IV Application of the composition as a coating material or a binder

Fillers (e.g., active agents, fillers, pigments, colorants, etc.) shown in Table 9 having a particle size of up to 200 microns were mixed with a selected OS-A composition (see Table 2) as shown in Table 10 and, after subjecting the resulting mixture to the preliminary step under the conditions shown in Table 10 to stabilize, the fillers-containing OS-A composition was mixed with a cross-linking agent and a curing agent to prepare pasty, fluid or plastic OS-compositions. Coating materials or binders formed by moisture curing of the OS-composition were prepared to test. Additionally, the fillers were previously subjected to drying treatment at about 200° C. to dehydrate them to some extent.

TABLE 9

| Sample No. | Name of Filler | Major Component | Particle Size |
|---|---|---|---|
| F-1 | Silica stone powder | $SiO_2$ | up to 44μ |
| F-2 | Talc powder | $MgO \; SiO_2$ | up to 44μ |
| F-3 | Fumed silica | $SiO_2$ | up to 10μ |
| F-4 | Alumina powder | $Al_2O_3$ | up to 44μ |
| F-5 | Silicon carbide powder | SiC | up to 44μ |
| F-6 | Mineral fiber powder | $Al_2O_3 \; SiO_2$ | up to 44μ |
| F-7 | Glass beads | $SiO_2$ | up to 80μ |
| F-8 | Silicon phosphate powder | $2SiO_2 \; P_2O_5$ | up to 44μ |
| F-9 | Boron phosphate powder | $B_2O_3 \; P_2O_5$ | up to 10μ |
| F-10 | Zinc chromate powder | $ZnCrO_4$ | up to 20μ |
| F-11 | Special glaze powder | $PbO \; SiO_2 \; B_2O_3$ | up to 10μ |
| F-12 | Titanium oxide | $TiO_2$ | up to 5μ |
| F-13 | Organic red pigment | Quinacridone type | up to 5μ |

Firstly, an OS-A mixture composition and a filler (combination thereof being selected as indicated in Table 7) were mixed with each other in amounts shown in Table 7, and the resulting mixture was subjected to the preliminary step under the conditions shown in Table 10. Then, the rest of the components (a cross-linking agent and a curing agent) of the OS-composition shown in Table 7 were mixed with the thus-treated mixture to prepare paint-like, fluid or plastic mixtures (OSP-compositions). Each of the OSP-compositions were subjected to the following tests to evaluate them as a coating material or a binder. Results thus obtained are also tabulated in Table 10.

Testing methods are as follows.

(1) Tacky-dry time

Each of the liquid organosiloxane composition was coated on a substrate, and was subjected to the curing step. Time required for the coat not to be tacky when a finger was pressed against it was measured (minute).

(2) Surface hardness

The same as with the testing method described in II.

(3) Heat resistance

The same as with the testing method for transparent film.

(4) Incombustibility

The same as with the testing method for transparent film.

(5) Alkali resistance

The same as with the testing method for transparent film (presented as Na resistance).

(6) Weatherability (weatherometer)

The same as with the testing method for transparent film.

(7) Adhesion properties

A prepared sample was cast into a 40×40×15 cm frame formed on a steel plate in the same manner as with the test pieces for testing transparent films, and was subjected to the preliminary step at 25° C. for 7 days to prepare a test piece wherein the test cured product was adhered to the steel plate. Then, each test piece was adhered to an attachment of a tester with an epoxy resin adhesive according to the adhesion-testing method prescribed by the Building Research Institute of the Ministry of Construction, and was pulled upward through hydraulic power of the tester to determine the load (P) at which the adhesion between the steel plate and the solidified test piece was broken. Adhesion force was determined from the load and presented in terms of kg/cm$_2$.

TABLE 10

| Sample No. | | P-1 | P-2 | P-3 | P-4 | P-5 | P-6 | P-7 |
|---|---|---|---|---|---|---|---|---|
| OS-Composition | | S-7 | S-6 | S-4 | S-11 | S-19 | S-2 | S-3 |
| OS-A Composition (Table 2) | No. | A-7 | A-6 | A-4 | A-4 | A-6 | A-2 | A-3 |
| | Parts by Weight | 70 | 60 | 75 | 75 | 60 | 70 | 60 |
| Filler | F-1 | — | 7 | — | — | — | 20 | — |

TABLE 10-continued

| (parts by weight) | | | | | | | |
|---|---|---|---|---|---|---|---|
| F-2 | — | 10 | 5 | 10 | 7 | 20 | 20 |
| F-3 | — | 3 | — | — | 3 | 5 | 5 |
| F-4 | — | — | 20 | — | 20 | — | — |
| F-5 | — | — | 20 | 10 | — | — | — |
| F-6 | — | — | — | — | 10 | 10 | — |
| F-7 | — | 100 | 75 | 90 | 200 | 95 | 100 |
| F-9 | — | — | 5 | 10 | — | — | — |
| F-10 | — | — | — | 10 | 10 | — | — |
| F-11 | — | — | 20 | — | — | — | — |
| F-12 | — | 30 | 5 | 20 | 20 | — | 10 |
| F-13 | 15 | — | — | — | — | — | — |
| Conditions of preliminary step, °C · h | 25 × 24 | 60 × 4 | 25 × 24 | 30 × 24 | 15 × 48 | 80 × 2 | 25 × 48 |
| Amount of cross-linking agent | 30 | 40 | 25 | 25 | 40 | 30 | 40 |
| Amount of Curing agent | 3 | 3 | 3 | 8 | 4 | 5 | 5 |
| Application manner | spray | spray | spray | roll | trowel | trowel | trowel |
| Curing temp. °C. | 22 | 80 | 22 | 130 | 60 | 20 | 20 |
| Test results Tack | 90 | 10 | 90 | 6 | 15 | 90 | 90 |
| Hardness | 4H | 6H | 4H | 6H | 6H | 8H | 8H |
| Heat resistance | good | good | good | good | good | good | good |
| Incombustibility | good | good | good | good | good | good | good |
| Na resistance | good | good | good | good | good | good | good |
| Weatherability | good | good | good | good | good | good | good |
| Adhesion property | 22 | 28 | 30 | 30 | 35 | 40 | 40 |
| Main uses | *1 | *2 | *3 | *4 | *5 | *6 | *7 |

*1: Enamel, etc.
*2: Coating composition, coating material, etc.
*3: Heat-resistant coating material, etc.
*4: Rust proof coating material, etc.
*5: Flooring, etc.
*6: Binder, etc.
*7: Anchorage material, etc.

As is seen from the above results, the organosiloxane compositions of the present invention can form, when used as a coating material or a binder, coating materials or binders having excellent heat resistance, incombustibility, alkali resistance, weatherability, and adhesion properties. V Application as structure-forming material Powdery fillers of up to 200 microns in particle size shown in Table 10 were mixed with the OS-A mixture composition, and the resulting mixture was subjected to the preliminary step to stabilize. Then, the filler-containing OS-A composition was compounded with a cross-linking agent and a curing agent to prepare OS-AB compositions. Each of the composition was unified with those materials of more than 200 microns in size, which are shown in Table 11, such as reinforcing materials, aggregates or moldings to prepare composite cured products. Reinforcing materials, aggregates, moldings, etc. used in this example are shown in Table 11. Additionally, these materials were previously subjected to drying treatment at about 200° C. before use to dehydrate enough.

TABLE 11

| Sample No. | Name of Material | Major Component | Size |
|---|---|---|---|
| M-1 | Sandy silica stone | SiO$_2$ | 220–2,000μ |
| M-2 | Sandy alumina | Al$_2$O$_3$ | 220–2,000μ |
| M-3 | Sandy silicon carbide | SiC | 220–2,000μ |
| M-4 | Artificial aggregate particles | SiO$_2$ Al$_2$O$_3$ | 220–2,000μ |
| M-5 | Fibrous metal | stainless steel | 0.3 × 12 mm |
| M-6 | Wire gauze | iron | 0.3 mmφ with 5-mm space |
| M-7 | Net | nylon | 0.2 mmφ with 2-mm space |
| M-8 | Massive industrial waste | Na$_2$SO$_4$ | 2 cmφ × 1.5 cm |
| M-9 | Cloth of texture | glass fiber | — |

The structures of this Example were prepared according to Table 12 and evaluated by the following testing method. Results thus obtained are also shown in Table 12.

(1) Heat resistance
Same as with testing transparent film.
(2) Incombustibility
Same as with testing transparent film.
(3) Compression strength
Each of the structure compositions was prepared in a rectangular frame (2×2×8 cm) according to JIS A 1108 and, after leaving for 7 days at room temperature, the frame was removed, followed by determining compression strength (kg/cm$^2$) according to JIS A 1108 using a compression tester.

TABLE 12

| Sample No. | N-1 | N-2 | N-3 | N-4 | N-5 | N-6 |
|---|---|---|---|---|---|---|

TABLE 12-continued

| No. of OS-composition | | S-19 | S-4 | S-11 | S-6 | S-19 | S-7 |
|---|---|---|---|---|---|---|---|
| OSP-composition (Table 10) | No. | P-5 | P-3 | P-4 | P-2 | P-5 | P-1 |
| | Parts of weight | 100 | 100 | 100 | 100 | 100 | 100 |
| Materials and amounts thereof (parts by weight) | M-1 | 40 | — | — | — | — | — |
| | M-2 | — | 20 | — | — | — | — |
| | M-3 | — | 30 | — | — | — | — |
| | M-4 | 50 | 50 | — | — | — | — |
| | M-5 | 10 | — | — | — | — | — |
| | M-6 | — | — | 50 | — | — | — |
| | M-7 | — | — | — | 2000 | — | — |
| | M-8 | — | — | — | — | 400 | — |
| | M-9 | — | — | — | — | — | 1500 |
| Application manner | | * | * | ** | *** | ** | *** |
| Curing temp. °C. | | 20 | 50 | 22 | 25 | 20 | 25 |
| Test results | Heat resistance | good | good | good | good | good | good |
| | Incombustibility | good | good | good | good | good | good |
| | Compression | 220 | 250 | 200 | — | 135 | — |
| Main uses | | *1 | *2 | *3 | *4 | *5 | *6 |

*: Mixing;
**: Casting
***: Dipping
*1: Thick flooring, etc.
*2: Heat-resistant flooring, etc.

What is claimed is:

1. A solvent-free, cold-setting ternary organosiloxane composition, which contains (A) liquid organopolysiloxane, (B) a cross-linking agent, and (C) a curing catalyst, said organopolysiloxane (A) constituted by a organosilicon group of X—Si wherein X represents a hydrogen atom or a monovalent hydrocarbyl group and functional side chain of OR wherein R represents a hydrogen atom, a $C_1$–$C_5$ alkyl group or an acyl group, said cross-linking agent (B) being at least one of an organoboron compound or an organosilicon compound having at least one functional group selected from the group consisting of an alkoxy group, an acyloxy group and an oxime group, and said curing catalyst (C) being a metal-containing organic compound, with the total content of the metal elements of the ternary composition being 40% by weight or more in terms of $MO_{y/2}$ wherein M represents aluminum, boron, silicon, titanium or zirconium, and y represents a valency of the metal elements.

2. The solvent-free, cold-setting ternary organosiloxane composition as described in claim 1, wherein said liquid organosiloxane (A) is a low molecular weight polysiloxane comprising one or more of the compounds represented by the following general formula (1):

wherein $R^1$ represents a hydrogen atom or a $C_1$ to $C_5$ alky or acyl group, $R^2$ to $R^6$, which may be the same or different, each represents a hydrogen atom, $OR^1$ or a monovalent hydrocarbyl group, and n represents a number smaller than 15, and having a silicon content of 50% by weight or more calculated on the basis of $SiO_2$.

3. The solvent-free, cold-setting ternary organosiloxane composition as described in claim 1 or 2, wherein said liquid organopolysiloxane (A) contains a dissolved powdery silicon resin having functional side chains of OR wherein R represents a hydrogen atom or a $C_1$ to $C_5$ alkyl or acyl group.

4. The solvent-free, cold-setting ternary organosiloxane composition as described in claim 2, wherein said liquid organopolysiloxane (A) further contains dissolved therein a thermoplastic organic resin of a linear organic compound having carboxyl groups in an amount of not more than 30% by weight of the composition.

5. The solvent-free, cold-setting ternary organosiloxane composition as described in claim 4, wherein said cross-linking agent (B) is one or more organometallic compounds represented by the following general formula (2) or (3):

$$R_p^7 \cdot (OR^1)_{3-p} \quad (2)$$

$$R_m^7 Si \cdot (OR^1)_{4-m} \quad (3)$$

wherein $R^1$ represents a hydrogen atom, a $C^1$–$C^5$ alkyl or acyl group, or an oxime group, $R^7$ represents a hydrogen atom, $OR^1$ or a monovalent hydrocarbyl group, p represents an integer of 0, 1 or 2, and m represents an integer of 0, 1, 2 or 3.

6. The solvent-free, cold-setting ternary organosiloxane agent (B) is mixed in an amount of up to 50% by weight based on said liquid organopolysiloxane (A).

7. The solvent-free, cold-setting ternary organosiloxane composition as described in claim 6, wherein said liquid organopolysiloxane (A), or said liquid organopolysiloxane (A) and said cross-linking agent (B), have been subjected to a temperature not higher than 100° C. for not shorter than 10 minutes in the absence of water to thereby remove contained silanol groups, and then combined with said curing catalyst (C), so as to be capable of being stored in a one-pack form.

8. The solvent-free, cold-setting ternary organosiloxane composition as described in claim 7, wherein said curing catalyst (C) is one or more of metal-containing organic compounds, with the metal being zinc, cobalt, aluminum or tin.

9. The solvent-free, cold-setting ternary organosiloxane composition as described in claim 8, wherein said curing catalyst (C) is in a blocked form of being unable to catalyze the reaction, with the blocking being attained with at least one keto-enol tautomer compound selected from the group consisting of alkyl group- or trifluoro group-containing β-keto-acids, β-diketone compounds and malonic esters in an amount of up to 50% by weight of the curing catalyst.

10. The solvent-free, cold-setting ternary organosiloxane composition as described in claim 8, wherein said curing catalyst (C) is retarded with one or more alcohols selected from the group consisting of monohydric alcohols and polyhydric alcohols in an amount of up to 50% by weight of the curing catalyst to thereby retard the catalytic reaction.

11. The solvent-free, cold-setting ternary organosiloxane composition as described in claim 9, wherein said blocked curing catalyst (C) is contained in an amount of up to 10% by weight based on said liquid organopolysiloxane (A).

12. A transparent film, which comprises a cured polymer containing polysiloxane bonds as a main chain formed by bringing the solvent-free, cold setting ternary organopolysiloxane composition according to claim 11 into contact with moisture.

13. A coating material, which comprises a cured composite formed by bringing into contact with moisture a mixture of 100 parts by weight of the solvent-free, cold-setting ternary organopolysiloxane composition described in claim 12, and 1 to 400 parts by weight of one or more materials selected from the group consisting of activating agents, fillers, and colorants, to thereby form main chain of polysiloxane bonds.

14. The coating material as described in claim 13, wherein said fillers, said liquid organopolysiloxane (A), have been subjected to heating to a temperature of 100° C. or less in the absence of water to thereby remove contained water or silanol groups, and then combined with said curing catalyst (C).

15. The coating material as described in claim 13, which contains activating agents, said activating agents being a powder of at least one material selected from the group consisting of compounds containing boric acid, compounds containing chromic acid and compounds containing phosphoric acid.

16. A binder which comprises a cured composite formed by bringing into contact with moisture a mixture of 100 parts by weight of the solvent-free, cold-setting ternary organopolysiloxane composition described in claim 11, and 1 to 500 parts by weight of one or more materials selected from the group consisting of activating agents, fillers, and colorants, to thereby form main chain of polysiloxane bonds.

17. The binder as described in claim 16, wherein said fillers, said liquid organopolysiloxane (A), said crosslinking agent (B) or a mixture thereof have been subjected to heating to a temperature of 100° C. or less in the absence of water to thereby remove contained water or silanol groups, and then combined with said curing catalyst (C).

18. The binder as described in claim 16, which contains activating agents, said activating agents being a powder of at least one material selected from the group consisting of compounds containing boric acid, compounds containing chromic acid and compounds containing phosphoric acid.

19. A structure which is formed by bringing into contact with moisture a mixture of 100 parts by weight of the mixture described in claim 13, and 1 to 2,000 parts by weight of reinforcing materials, to thereby produce a composite polymer containing as main chain polysiloxane bonds.

20. A structure as described in claim 19, wherein the reinforcing materials include aggregates.

21. A structure which is formed by bringing into contact with moisture a mixture of 100 parts by weight of the fluid or plastic mixture described in claim 16 and 1 to 2,000 parts by weight of one or more of reinforcing materials, aggregates and moldings to thereby produce a composite polymer containing as main chain polysiloxane bonds.

* * * * *

UNITED STATES PATENT AND TRADEMARK OFFICE
CERTIFICATE OF CORRECTION

PATENT NO. : 5,292,799
DATED : March 8, 1994
INVENTOR(S) : Naito, et al

It is certified that error appears in the above-indentified patent and that said Letters Patent is hereby corrected as shown below:

On the title page, Item [30], "August 5, 1992" should read --August 15, 1992--.

Signed and Sealed this

Sixth Day of September, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,292,799
DATED : March 8, 1994
INVENTOR(S) : Naito, et al

It is certified that error appears in the above-indentified patent and that said Letters Patent is hereby corrected as shown below:

On the title page, item [30], "August 5, 1992" should read --August 15, 1992--

This certificate supersedes Certificate of Correction issued September 6, 1994.

Signed and Sealed this

Twenty-first Day of February, 1995

Attest:

BRUCE LEHMAN

Attesting Officer

Commissioner of Patents and Trademarks